(12) United States Patent
Morizur et al.

(10) Patent No.: US 9,751,980 B2
(45) Date of Patent: Sep. 5, 2017

(54) PHOTOACTIVE ADDITIVES WITH PHOTOACTIVE MONOMERS AND ENDCAPS

(71) Applicant: SABIC Innovative Plastics IP B.V., Bergen op Zoom (NL)

(72) Inventors: Jean-Francois Morizur, Evansville, IN (US); Paul Dean Sybert, Evansville, IN (US); James Franklin Hoover, Evansville, IN (US); Peter Johnson, Evansville, IN (US); Thomas L. Evans, Mount Vernon, IN (US); Amanda Marie Flores, Evansville, IN (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 14/209,735

(22) Filed: Mar. 13, 2014

(65) Prior Publication Data

US 2014/0275321 A1    Sep. 18, 2014

Related U.S. Application Data

(60) Provisional application No. 61/780,222, filed on Mar. 13, 2013.

(51) Int. Cl.
*C08G 64/14* (2006.01)
*C08J 7/12* (2006.01)
(Continued)

(52) U.S. Cl.
CPC ............ *C08G 64/14* (2013.01); *C08G 64/06* (2013.01); *C08G 64/24* (2013.01); *C08J 7/123* (2013.01); *C08K 5/42* (2013.01); *C08L 69/00* (2013.01)

(58) Field of Classification Search
CPC ........ C08G 64/06; C08G 64/14; C08G 64/24; C08J 7/123; C08K 5/42; C08L 69/00
See application file for complete search history.

(56) References Cited

U.S. PATENT DOCUMENTS 4,153,780 A    5/1979   Narita et al.
4,333,809 A    6/1982   Schreckenberg et al.
(Continued)

FOREIGN PATENT DOCUMENTS

CN         1454914 A     11/2003
DE         2746141        4/1979
(Continued)

OTHER PUBLICATIONS

International Search Report for International Application No. PCT/US2014/026346 dated Jul. 8, 2014.
(Continued)

*Primary Examiner* — Sanza McClendon
(74) *Attorney, Agent, or Firm* — Richard M. Klein; Fay Sharpe LLP

(57) ABSTRACT

Photoactive additives, such as cross-linkable polycarbonate resins, are disclosed. The additive is formed from the reaction of a monohydroxybenzophenone, a dihydroxybenzophenone, a diol chain extender, and one or more linker moieties having functional groups that react with the phenolic groups on the other ingredients. If desired, a secondary linker moiety and/or an end-capping agent can be used. When added to a base polymeric resin, the photoactive additive permits crosslinking when exposed to ultraviolet light.

53 Claims, 4 Drawing Sheets

(51) Int. Cl.
*C08L 69/00* (2006.01)
*C08G 64/06* (2006.01)
*C08K 5/42* (2006.01)
*C08G 64/24* (2006.01)

(56) References Cited

U.S. PATENT DOCUMENTS

| | | |
|---|---|---|
| 4,831,109 A | 5/1989 | Mitra et al. |
| 5,034,496 A | 7/1991 | Bales et al. |
| 5,916,942 A | 6/1999 | Scholl et al. |
| 2012/0253002 A1 | 10/2012 | Ozaki et al. |

FOREIGN PATENT DOCUMENTS

| | | |
|---|---|---|
| DE | 29 30 787 A1 | 2/1981 |
| EP | 0 001 577 A1 | 5/1979 |
| EP | 0 006 579 A1 | 1/1980 |
| JP | 08-238309 | 9/1996 |
| JP | 2002-226571 | 8/2002 |

OTHER PUBLICATIONS

International Search Report for International Application No. PCT/US2014/026401 dated Jul. 8, 2014.
Chinese Office Action for Application No. 201480013176.9 dated Jul. 4, 2016.
European Office Action for EP Application No. 14 717 601.0 dated Jan. 23, 2017.

PHOTOACTIVE ADDITIVES WITH PHOTOACTIVE MONOMERS AND ENDCAPS

This application claims priority to U.S. Provisional Patent application Ser. No. 61/780,222, filed Mar. 13, 2013. The disclosure of each application is hereby fully incorporated by reference herein.

BACKGROUND

The present disclosure relates to photoactive additives that include a photoactive monomer derived from a dihydroxybenzophenone and a photoactive end-capping agent derived from a monohydroxybenzophenone. Also included are compositions including such additives, as well as products (e.g. molded articles, sheets, films, etc.) formed from such compositions.

Polycarbonates (PC) are synthetic engineering thermoplastic resins, and are a useful class of polymers having many beneficial properties. Polycarbonate resins are both strong and transparent, and are used for a number of different commercial applications, including electronic engineering (E&E) parts, mechanical parts, etc.

Polycarbonate polymers/resins and blends containing polycarbonate polymers exhibit flame retardance properties. However, such polymers drip when exposed to a flame, and this behavior worsens as the wall thickness decreases. This behavior greatly diminishes their use in transparent and opaque thin wall applications where a V0 or 5VA flame retardance rating is required. These polymers also have relatively poor chemical resistance. It would be desirable to provide additives that can improve these properties.

BRIEF DESCRIPTION

The present disclosure relates to additives which can be used to crosslink resins (e.g. polycarbonates) and improve their flame resistance and chemical resistance. The additives, which can be cross-linkable polycarbonate resins, are formed by the reaction of at least a first photoactive moiety having one functional group and acting as an end-capping agent, a second photoactive moiety having two functional groups and acting as a monomer, and a first linker moiety that forms covalent bonds with the first and second photoactive moieties together. Generally, carbonate or ester linkages are found in the additives. In particular embodiments, the photoactive additives are polycarbonate copolymers containing a monohydroxybenzophenone end-capping agent and a dihydroxybenzophenone monomer that can crosslink when exposed to ultraviolet (UV) radiation. Also included are compositions comprising such additives, as well as the resulting cross-linked products formed therefrom.

Disclosed in various embodiments herein are photoactive additives formed from the reaction of: a monohydroxybenzophenone; a dihydroxybenzophenone; a diol chain extender; and a first linker moiety comprising a plurality of functional groups, wherein each functional group reacts with the hydroxyl groups of the monohydroxybenzophenone, the dihydroxybenzophenone and the diol chain extender.

The photoactive additive may comprise about 0.5 mole % to 5.0 mole % endcap groups derived from the monohydroxybenzophenone, prior to UV exposure. In particular embodiments, the monohydroxybenzophenone is 4-hydroxybenzophenone.

The additive can be made by the process of: combining the dihydroxybenzophenone, the diol chain extender, a tertiary amine catalyst, water, and a water-immiscible solvent to form a reaction mixture; adding the first linker moiety to the reaction mixture over a first time period while co-adding a base to regulate the reaction pH; adding the monohydroxybenzophenone to the reaction mixture for a second time period while continuing to add the first linker moiety and the base; and continuing to add the first linker moiety and the base to the reaction mixture for a third time period after addition of the monohydroxybenzophenone is complete to obtain the photoactive additive In particular embodiments, the additive contains at least 2.8 mole % endcap groups derived from the monohydroxybenzophenone and has a weight average molecular weight of at most 32,000, prior to UV exposure. In yet more specific embodiments, the additive contains at least 3.0 mole % endcap groups derived from the monohydroxybenzophenone and has a weight average molecular weight of at most 30,000, prior to UV exposure.

In other specific embodiments, the additive contains less than 10 mole % of the dihydroxybenzophenone and a tensile bar of the additive of 3.2 mm thickness has at least 70% elongation at break when exposed to acetone at 1% strain after being exposed to 36.0 J/cm$^2$ of UVA radiation. More specifically, the additive contains about 5 mole % of the dihydroxybenzophenone.

In other specific embodiments, the additive contains less than 10 mole % of the dihydroxybenzophenone and a tensile bar of the additive of 3.2 mm thickness has a delta YI of 12 or less after being exposed to at least 36.0 J/cm$^2$ of UVA radiation, the YI being measured before UV exposure and at least 48 hours after UV exposure. More specifically, the additive contains about 5 mole % of the dihydroxybenzophenone.

The photoactive additive may comprise about 0.5 mole % to about 50 mole % of the dihydroxybenzophenone, prior to UV exposure. In particular embodiments, the dihydroxybenzophenone is 4,4'-dihydroxybenzophenone.

The additive may have a weight average molecular weight of 15,000 or greater prior to UV exposure. The molar ratio of the monohydroxybenzophenone to the first linker moiety may be from 1:2 to 1:200 prior to UV exposure. The molar ratio of the dihydroxybenzophenone to the first linker moiety may be from 1:2 to 1:200 prior to UV exposure.

Sometimes, the reaction further comprises a non-photoactive end-capping agent selected from the group consisting of phenol, p-t-butylphenol, p-cumylphenol, octylphenol, and p-cyanophenol.

In particular embodiments, the photoactive additive is a cross-linkable polycarbonate resin having a weight-average molecular weight from 17,000 to 80,000 Daltons, as measured by GPC using a UV detector and polycarbonate standards.

In other embodiments, the photoactive additive is a cross-linkable polycarbonate resin having a polydispersity index (PDI) of between 2.0 and 3.5 as measured by GPC using a UV-VIS detector and polycarbonate standards prior to UV exposure.

In particular embodiments, the monohydroxybenzophenone is 4-hydroxybenzophenone; the dihydroxybenzophenone is 4,4'-dihydroxybenzophenone; the diol chain extender is bisphenol-A; and the first linker moiety is phosgene.

The diol chain extender may have the structure of one of the following Formulas (B)-(I), as described further herein.

The first linker moiety may have the structure of one of the following Formulas (30, (32), (33), or (36)-(42), as described further herein.

Sometimes, the reaction that forms the photoactive additive further comprises a secondary linker moiety having at least three functional groups, each of which can react with a functional group of the first linker moiety. The secondary linker moiety can have the structure of one of the following Formulas (43)-(49), as described further herein.

Also disclosed are products formed from a composition comprising the photoactive additive described above. In particular embodiments, the product is a film, a sheet, a layer of a multilayer film, or a layer of a multilayer sheet. The product can be formed by injection molding, overmolding, co-injection molding, extrusion, multilayer extrusion, rotational molding, blow molding, or thermoforming. Generally, the product is exposed to UV radiation to cause crosslinking of the cross-linkable polycarbonate resin. The product may be transparent, or may have a thin wall having a cross-section of 3 mm or less.

Also disclosed are blends comprising the additive of claim 1 and a polymeric base resin that is different from the photoactive additive.

Also disclosed herein are processes for improving at least one property of an product produced from a polymeric base resin, comprising: blending with the polymeric base resin the photoactive additive (described above) to produce a blend; forming the product from the blend; and exposing a surface of the formed product to an effective dosage of ultraviolet radiation to cause crosslinking on the surface of the product.

The improved property can be selected from the group consisting of anti-drip, flame retardance, chemical resistance, tear resistance, impact strength, ductility, hydrolytic stability, and weatherability.

The UV radiation may be filtered using a 280 nm long pass filter to provide no detectable UVC radiation, as measured using an EIT PowerPuck. Sometimes, the UV radiation source is a metal halide doped mercury lamp, an electrodeless D-bulb, an electrodeless H-bulb, an electrodeless V-bulb, a Xenon Arc lamp, or a UVA (320-390 nm) light emitting diode (LED).

Also disclosed are crosslinked layers formed from a polymeric blend that has been exposed to UV radiation, the blend comprising: a photoactive additive that is a polycarbonate resin formed from the reaction of a monohydroxybenzophenone, a dihydroxybenzophenone, a diol chain extender, and a first linker moiety comprising a plurality of functional groups, wherein each functional group reacts with the hydroxyl groups of the monohydroxybenzophenone, the dihydroxybenzophenone and the diol chain extender; and a polymer resin which is different from the photoactive additive.

The crosslinked layer can contain chains from both the photoactive additive and the polymer resin. The crosslinking may be sufficient to create a continuous insoluble layer containing both the photoactive additive and the polymer resin. The crosslinked layer can be formed by exposure to 36.0 J/cm$^2$ of UVA radiation and no detectable UVC radiation.

Additionally disclosed are compositions comprising a cross-linked polycarbonate, the cross-linked polycarbonate derived from a cross-linkable polycarbonate resin formed from the reaction of a monohydroxybenzophenone, a dihydroxybenzophenone, a diol chain extender, and a first linker moiety comprising a plurality of functional groups, wherein each functional group reacts with the hydroxyl groups of the monohydroxybenzophenone, the dihydroxybenzophenone and the diol chain extender.

In particular embodiments, the monohydroxybenzophenone is 4-hydroxybenzophenone; the dihydroxybenzophenone is 4,4'-dihydroxybenzophenone; the diol chain extender is bisphenol-A; and the first linker moiety is phosgene.

In certain embodiments, the cross-linkable polycarbonate resin contains from about 0.5 mole % to about 5.0 mole % of endcaps derived from the monohydroxybenzophenone prior to cross-linking. In other and overlapping embodiments, the cross-linkable polycarbonate resin contains from about 0.5 mole % to about 50 mole % of the dihydroxybenzophenone prior to cross-linking.

Sometimes, the cross-linkable polycarbonate resin further contains endcaps derived from an end-capping agent selected from the group consisting of phenol, p-t-butylphenol, p-cumylphenol, octylphenol, and p-cyanophenol.

The cross-linkable polycarbonate resin may have a weight average molecular weight of 15,000 or greater prior to cross-linking. The cross-linkable polycarbonate resin may have a weight-average molecular weight from 17,000 to 80,000 Daltons, as measured by gel permeation chromatography using a UV-VIS detector and polycarbonate standards prior to cross-linking. The cross-linkable polycarbonate resin may have a polydispersity index (PDI) of between 2.0 and 3.5 as measured by gel permeation chromatography using a UV-VIS detector and polycarbonate standards prior to cross-linking. The cross-linkable polycarbonate resin may have a melt flow rate of about 1 to about 40 g/10 min at 300° C./1.2 kg/360 sec dwell prior to cross-linking. The cross-linkable polycarbonate resin may have a melt flow rate of about 1 to about 40 g/10 min at 300° C./1.2 kg/360 sec dwell prior to cross-linking.

A plaque formed from the composition can achieve UL94 5VA performance at a thickness of 1.5 mm (±10%) after UV irradiation of 36.0 J/cm$^2$ UVA.

In some embodiments, when a plaque of the composition is exposed to 36.0 J/cm$^2$ of UVA radiation, the cross-linkable polycarbonate resin increases in molecular weight by at least 15%. A plaque of the composition may have at least 90% elongation at break when exposed to acetone at 0.5% strain, or at least 100% elongation at break.

The composition can further comprise an impact modifier, UV stabilizer, colorant, flame retardant, heat stabilizer, plasticizer, lubricant, mold release agent, filler, reinforcing agent, antioxidant agent, antistatic agent, blowing agent, or radiation stabilizer. In particular embodiments, the flame retardant is potassium perfluorobutane sulfonate (Rimar salt), potassium diphenyl sulfone-3-sulfonate (KSS), or a combination thereof.

Also disclosed herein are blends comprising: a photoactive additive that is a cross-linkable polycarbonate resin formed from the reaction of a monohydroxybenzophenone, a dihydroxybenzophenone, a diol chain extender, and a first linker moiety comprising a plurality of functional groups, wherein each functional group reacts with the hydroxyl groups of the monohydroxybenzophenone, the dihydroxybenzophenone and the diol chain extender; and a polycarbonate resin that is different from the photoactive additive.

The blend may further comprise a flame retardant that is potassium perfluorobutane sulfonate (Rimar salt), potassium diphenyl sulfone-3-sulfonate (KSS), or a combination thereof. A plaque formed from the blend can achieve UL94 5VA performance at a thickness of 1.5 mm (±10%) after UV irradiation of 36.0 J/cm$^2$ UVA. In particular embodiments, the cross-linkable polycarbonate resin contains about 5 mole % of the dihydroxybenzophenone.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
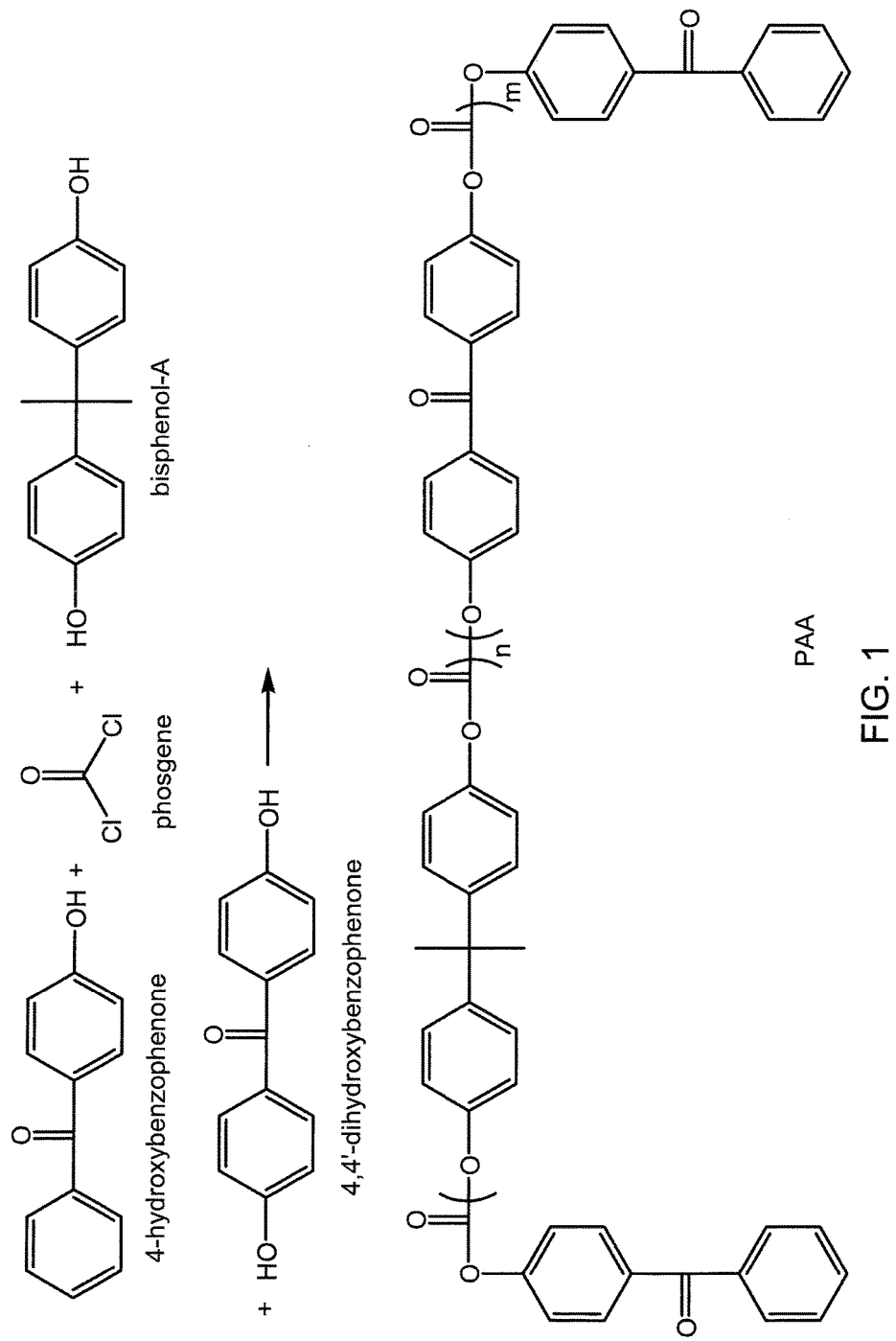
FIG. 1 illustrates the formation of a photoactive additive (oligomer/polymer) from a monofunctional photoactive moiety, a difunctional photoactive moiety, a first linker moiety, and a diol chain extender.

The present disclosure may be understood more readily by reference to the following detailed description of desired embodiments and the examples included therein. In the following specification and the claims which follow, reference will be made to a number of terms which shall be defined to have the following meanings.

DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, the aldehyde group —CHO is attached through the carbon of the carbonyl group.

The term "aliphatic" refers to an linear or branched array of atoms that is not aromatic. The backbone of an aliphatic group is composed exclusively of carbon. The aliphatic group may be substituted or unsubstituted. Exemplary aliphatic groups include, but are not limited to, methyl, ethyl, isopropyl, hexyl, and cyclohexyl.

The term "aromatic" refers to a radical having a ring system containing a delocalized conjugated pi system with a number of pi-electrons that obeys Hückel's Rule. The ring system may include heteroatoms such as nitrogen, sulfur, selenium, silicon and oxygen, or may be composed exclusively of carbon and hydrogen. Aromatic groups are not substituted. Exemplary aromatic groups include, but are not limited to, phenyl, pyridyl, furanyl, thienyl, naphthyl and biphenyl.

The term "ester" refers to a radical of the formula —CO—O—, wherein the carbon atom and the oxygen atom are both covalently bonded to carbon atoms.

The term "carbonate" refers to a radical of the formula —O—CO—O—, wherein the oxygen atoms are both covalently bonded to carbon atoms. Note that a carbonate group is not an ester group, and an ester group is not a carbonate group.

The terms "carboxy" or "carboxyl" refers to a radical of the formula —COOH, wherein the carbon atom is covalently bonded to another carbon atom.

The term "alkyl" refers to a radical composed entirely of carbon atoms and hydrogen atoms which is fully saturated. The alkyl radical may be linear, branched, or cyclic.

The term "aryl" refers to an aromatic radical that is composed exclusively of carbon and hydrogen. Exemplary aryl groups include phenyl, naphthyl, and biphenyl. Note that "aryl" is a subset of aromatic.

The term "heteroaryl" refers to an aromatic radical having a ring system that is composed of carbon, hydrogen, and at least one heteroatom. Exemplary heteroaryl groups include pyridyl, furanyl, and thienyl. Note that "heteroaryl" is a subset of aromatic, and is exclusive of "aryl".

The term "halogen" refers to fluorine, chlorine, bromine, and iodine.

The term "alkoxy" refers to an alkyl radical which is attached to an oxygen atom, i.e. —O—$C_nH_{2n+1}$.

The term "aryloxy" refers to an aryl radical which is attached to an oxygen atom, e.g. —O—$C_6H_5$.

The term "hydrocarbon" refers to a radical which is composed exclusively of carbon and hydrogen. Both alkyl and aryl groups are considered hydrocarbon groups.

The term "alkenyl" refers to a radical composed entirely of carbon atoms and hydrogen atoms which contains at least one carbon-carbon double bond that is not part of an aryl or heteroaryl structure. The alkenyl radical may be linear, branched, or cyclic. An exemplary alkenyl radical is vinyl (—CH=$CH_2$).

The term "alkenyloxy" refers to a alkenyl radical which is attached to an oxygen atom, e.g. —O—CH=$CH_2$.

The term "arylalkyl" refers to an aryl radical which is attached to an alkyl radical, e.g. benzyl (—$CH_2$—$C_6H_5$).

The term "alkylaryl" refers to an alkyl radical which is attached to an aryl radical, e.g. tolyl (—$C_6H_4$—$CH_3$).

The term "amino" refers to a radical of the formula R—$NH_2$, wherein R is a carbon atom. For purposes of this disclosure, the amino group is a primary amino group, i.e. contains two hydrogen atoms.

The term "carbamate" refers to a radical of the formula —NH—CO—O—, wherein the nitrogen atom and the oxygen atom are both covalently bonded to carbon atoms.

The term "copolymer" refers to a polymer derived from two or more structural unit or monomeric species, as opposed to a homopolymer, which is derived from only one structural unit or monomer.

The term "$C_3$-$C_6$ cycloalkyl" refers to cyclopropyl, cyclobutyl, cyclopentyl or cyclohexyl.

The terms "Glass Transition Temperature" or "Tg" refer to the maximum temperature that a polymer, such as a polycarbonate, will have one or more useful properties. These properties include impact resistance, stiffness, strength, and shape retention. The Tg of a polycarbonate therefore may be an indicator of its useful upper temperature limit, particularly in plastics applications. The Tg may be measured using a differential scanning calorimetry method and expressed in degrees Celsius. The glass transition temperatures (Tg) described herein are measures of heat resistance of, for example, polycarbonate and polycarbonate blends. The Tg can be determined by differential scanning calorimetry, for example by using a TA Instruments Q1000 instrument, for example, with setting of 20° C./min ramp rate and 40° C. start temperature and 200° C. end temperature.

The term "halo" means that the substituent to which the prefix is attached is substituted with one or more independently selected halogen radicals. For example, "$C_1$-$C_6$ haloalkyl" means a $C_1$-$C_6$ alkyl substituent wherein one or more hydrogen atoms are replaced with independently selected halogen radicals. Non-limiting examples of $C_1$-$C_6$ haloalkyl include chloromethyl, 1-bromoethyl, fluoromethyl, difluoromethyl, trifluoromethyl, and 1,1,1-trifluoroethyl. It should be recognized that if a substituent is substituted by more than one halogen radical, those halogen radicals may be identical or different (unless otherwise stated).

The term "haze" refers to the percentage of transmitted light, which in passing through a specimen deviates from the incident beam by forward scattering. Percent (%) haze may be measured according to ASTM D 1003-07.

The term "Melt Volume Rate" (MVR) or "Melt Flow Rate (MFR)" refers to the flow rate of a polymer in a melt phase as determined using the method of ASTM D1238-10. The MVR of a molten polymer is measured by determining the amount of polymer that flows through a capillary of a specific temperature over a specified time using standard weights at a fixed temperature. MVR is expressed in cubic centimeter per 10 minutes, and MFR is expressed in grams per 10 minutes. The higher the MVR or MFR value of a polymer at a specific temperature, the greater the flow of that polymer at that specific temperature.

The term "Percent transmission" or "% transmission" refers to the ratio of transmitted light to incident light, and may be measured according to ASTM D 1003-07.

"Polycarbonate" as used herein refers to an oligomer or a polymer comprising residues of one or more monomers, joined by carbonate linkages.

"Thermal stability" as used herein refers to resistance of a polymer to molecular weight degradation under thermal conditions. Thus, a polymer with poor thermal stability may show significant molecular weight degradation under thermal conditions, such as during extrusion, molding, thermoforming, hot-pressing, and like conditions. Molecular weight degradation may also be manifest through color formation and/or in the degradation of other properties such as weatherability, gloss, mechanical properties, and/or thermal properties. Molecular weight degradation can also cause significant variation in processing conditions such as melt viscosity changes.

The term "crosslink" and its variants refer to the formation of a stable covalent bond between two polymers/oligomers. This term is intended to encompass the formation of covalent bonds that result in network formation, or the formation of covalent bonds that result in chain extension. The term "cross-linkable" refers to the ability of a polymer/oligomer to form such stable covalent bonds.

The present disclosure refers to "polymers," "oligomers", and "compounds". A polymer is a large molecule composed of multiple repeating units chained together, the repeating units being derived from a monomer. One characteristic of a polymer is that different molecules of a polymer will have different lengths, and a polymer is described as having a molecular weight that is based on the average value of the chains (e.g. weight average or number average molecular weight). The art also distinguishes between an "oligomer" and a "polymer", with an oligomer having only a few repeating units, while a polymer has many repeating units. For purposes of this disclosure, the term "oligomer" refers to such molecules having a weight average molecular weight of less than 15,000, and the term "polymer" refers to molecules having a weight average molecular weight of 15,000 of more, as measured by GPC using polycarbonate molecular weight standards. In contrast, for a compound, all molecules will have the same molecular weight. Compared to a polymer, a compound is a small molecule. These molecular weights are measured prior to any UV exposure.

Additives

The present disclosure relates to photoactive additives (PAA), and to compositions containing such additives. When the photoactive additive is added to one or more base resins and is then exposed to the appropriate wavelength of light, the resulting composition will have improved anti-drip and flame retardant properties compared to the base resins alone or to the composition prior to the light exposure. For example, the chemical resistance, propensity to drip during burning, or the propensity to form a hole when exposed to a flame can be improved. Improved flame resistance performance characteristics may include flame out time (FOT) and time to drip (TTD). The compositions, blended or neat, can be used to provide thin-walled materials that are UL94 5VA compliant. The compositions can be used to provide thin-walled materials that are 5VA compliant and highly transparent. The compositions may also exhibit good chemical resistance, tear resistance, impact strength, ductility, hydrolytic stability, and/or weatherability.

Generally, the photoactive additives (PAA) of the present disclosure include photoactive moieties that are covalently linked together through a first linker moiety and possibly a secondary linker moiety. The photoactive moieties contain a photoactive ketone group that, when exposed to the appropriate wavelength(s) of ultraviolet light, will form a stable covalent bond between the PAA and the polymeric resin. The PAA should be stable at conventional blending, forming, and processing temperatures (i.e. stable at 350° C. or above). The PAA also should not induce the degradation of the polymeric resin with which it is blended.

The term "photoactive moiety" refers to a moiety that, when exposed to ultraviolet light of the appropriate wavelength, crosslinks with another molecule. Thus, for example, the bisphenol-A monomer in a bisphenol-A homopolymer would not be considered a photoactive moiety, even though photo-Fries rearrangement can occur upon exposure to light, because the atoms do not participate in crosslinking but merely in rearrangement of the polymer backbone.

The photoactive additive is formed from a reaction mixture containing at least a first photoactive moiety, a second photoactive moiety, and a first linker moiety. The first photoactive moiety comprises (i) a ketone group and (ii) only one phenolic group. The second photoactive moiety comprises (i) a ketone group and (ii) only two phenolic groups. The linker moiety comprises a plurality of linking groups that can react with the phenolic groups of the first photoactive moiety and the second photoactive moiety. The reaction product is the photoactive additive (PAA). The molar ratio of the first photoactive moiety to the first linker moiety can be from 1:2 to 1:200. The molar ratio of the second photoactive moiety to the first linker moiety can be from 1:2 to 1:200. The molar ratio of the first photoactive moiety to the second photoactive moiety can be from 1:2 to 1:200. A non-photoactive end-capping agent can also be included in the reaction mixture. As desired, a diol chain extender can also be included. The end-capping agent and the chain diol extender do not have photoactive properties.

The term "ketone group" refers to a carbonyl group (—CO—) that is bonded to two other carbon atoms (i.e. —R—CO—R'—). The two other carbon atoms can be in an aliphatic group or in an aromatic group. An ester group and a carboxylic acid group are not considered to be a ketone group because the carbonyl group is bonded to one carbon atom and an oxygen atom.

The term "phenolic group" refers to a phenyl group (—C$_6$H$_4$—) with a hydroxyl group (—OH) covalently bonded to a carbon atom in the phenyl group.

The first photoactive moiety acts as an end-capping agent. The photoactive additive may comprise about 0.5 mole % to about 5.0 mole % endcap groups derived from the first photoactive moiety. Examples of such photoactive end-capping agents include those having the structure of one of Formulas (1), (3), or (5)-(10):

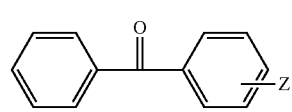

Formula (1)

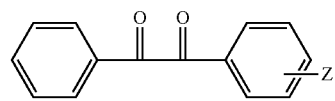

Formula (3)

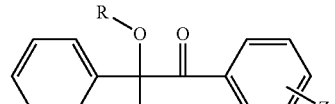

Formula (5)

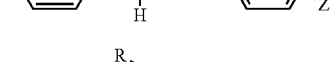

Formula (6)

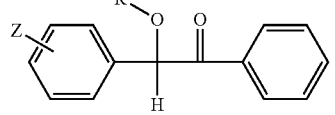

Formula (7)

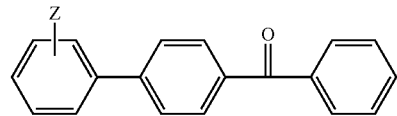

Formula (8)

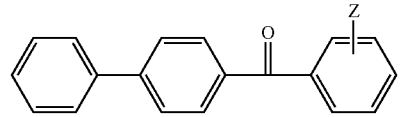

Formula (9)

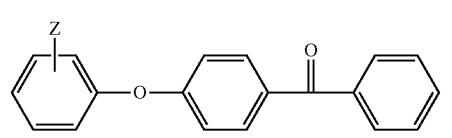

Formula (10)

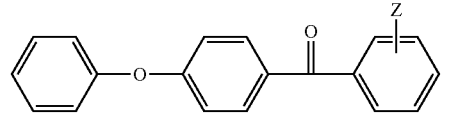

wherein Z is hydroxyl, amino, or —COY, wherein Y is hydroxyl, alkoxy, aryloxy, or halogen; and R is H, alkyl, or aryl.

The compound of Formula (1) is a (Z)benzophenone. The compound of Formula (3) is a 1-(Z)phenyl-2-phenylethane-1,2-dione. The compound of Formula (5) is a 1-((Z)phenyl)-2-hydrocarboxy-2-phenylethanone. The compound of Formula (6) is a 2-((Z)phenyl)-2-hydrocarboxy-1-phenylethanone. The compound of Formula (7) is a 4-((Z)phenyl)-benzophenone. The compound of Formula (8) is a 4-(Z)-4'-phenylbenzophenone. The compound of Formula (9) is a 4-[(((Z))phenoxy]-benzophenone. The compound of Formula (10) is a 4-(Z)-4'-phenoxy-benzophenone. In this paragraph, (Z) represents the functional group.

In some other embodiments of a photoactive end-capping agent, the R and R' groups attached to the ketone group form a ring structure. In such embodiments, the aromatic rings can include both aryl rings or heteroaryl rings. Examples of such photoactive end-capping agents include those having the structure of one of Formulas (13)-(14):

Formula (13)

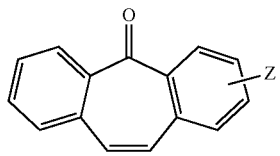

Formula (14)

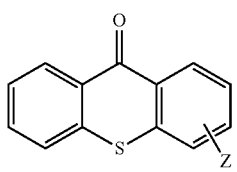

wherein Z is hydroxyl, amino, or —COY, wherein Y is hydroxyl, alkoxy, aryloxy, or halogen.

The compound of Formula (13) is a (Z)dibenzo[1,3-e:1',2'-f][7]annulen-11-one. The compound of Formula (14) is a (Z)thioxanthen-9-one. In this paragraph, (Z) represents the functional group.

In particular embodiments, the first photoactive moiety is a monohydroxybenzophenone. Suitable monohydroxybenzophenone chain-stoppers include, but are not limited to, 2-hydroxybenzophenone, 3-hydroxybenzophenone, 4-hydroxybenzophenone, 4-hydroxybenzoylbenzophenone, 2-hydroxy-4-methoxybenzophenone, 2-hydroxy-4-methoxy-2'-carboxybenzophenone, 2-hydroxy-4-octoxybenzophenone, 2-hydroxy-4-stearoxybenzophenone, 4-dodecyloxy-2-hydroxybenzophenone, 2-hydroxy-4-methoxy-5-sulfobenzophenone trihydrate, and 2-hydroxy-4-methoxybenzophenone-5-sulfonic acid. In preferred embodiments, the monohydroxybenzophenone chain stopper is a 2-hydroxybenzophenone, 3-hydroxybenzophenone, or 4-hydroxybenzophenone, each of which may be further substituted with one or more additional substituents, provided the monohydroxybenzophenone still functions as a chain-stopper. In further preferred embodiments, the monohydroxybenzophenone is 4-hydroxybenzophenone.

The second photoactive moiety can be a dihydroxyphenone, wherein the phenolic group is directly bonded to the ketone group. Examples of such photoactive moieties include those having the structure of one of Formulas (16)-(21):

Formula (16)

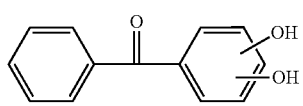

Formula (17)

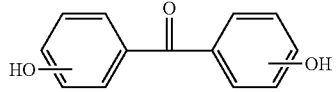

Formula (18)

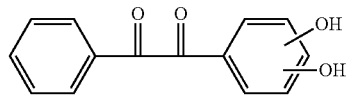

Formula (19)

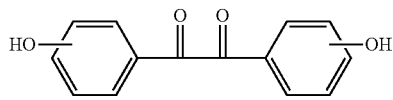

Formula (20)

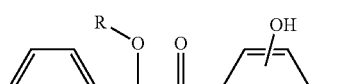

Formula (21)

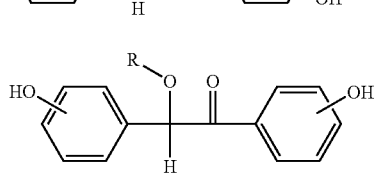

wherein R is H, alkyl, or aryl.

The compound of Formula (16) is a dihydroxyphenyl-phenylmethanone. The compound of Formula (17) is a bis(hydroxyphenyl)methanone. The compounds of Formulas (16) or (17) could also be referred to as dihydroxybenzophenones. The compound of Formula (18) is a 1-dihydroxyphenyl-2-phenylethane-1,2-dione. The compound of Formula (19) is a 1,2-bis(hydroxyphenyl)ethane-1,2-dione. The compounds of Formulas (18) or (19) could also be referred to as dihydroxybenzils. The compound of Formula (20) is a 1-(dihydroxyphenyl)-2-hydrocarboxy-2-phenylethanone. The compound of Formula (21) is a 1,2-bis(hydroxyphenyl)-2-hydrocarboxy-ethanone.

In some other embodiments, the R and R' groups attached to the ketone group form a ring structure. In such embodiments, the aromatic rings can include both aryl rings or heteroaryl rings. Examples of such photoactive moieties include those having the structure of one of Formulas (26)-(29):

Formula (26)

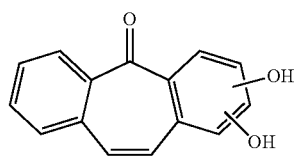

Formula (27)

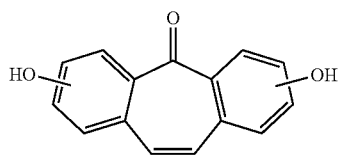

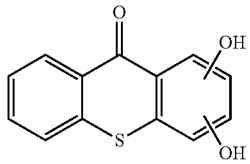

Formula (28)

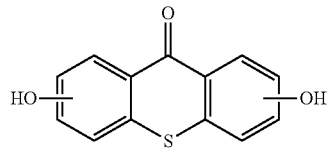

Formula (29)

The compounds of Formula (26) and (27) are a dihydroxydibenzo[1,3-e:1',2'-f][7]annulen-11-one. The compounds of Formula (28) and (29) are a dihydroxythioxanthen-9-one. The different formulas reflect the location of the two hydroxyl groups (either on the same ring, or on a different ring).

The photoactive additive may comprise about 0.5 mole % to about 50 mole % of the second photoactive moiety. In particular embodiments, the second photoactive moiety is a dihydroxybenzophenone. In more particular embodiments, the second photoactive moiety has the structure of Formula (17), and is desirably 4,4'-dihydroxybenzophenone.

The first photoactive moiety and the second photoactive moiety are reacted with one or more first linker moieties. The first linker moiety comprises a plurality of functional groups that can react with the phenolic group(s) of the photoactive moieties. Examples of such functional groups include a carboxylic acid (and anhydrides thereof), an acyl halide, an alkyl ester, and an aryl ester. These functional groups are illustrated below in general formula (A):

Formula (A)

where Y is hydroxyl, halogen, alkoxy, or aryloxy. The functional groups can be joined to an aliphatic group or an aromatic group which serves as a "backbone" for the linker moiety. In particular embodiments, the linker moiety can have two, three, four, or even more functional groups.

Some examples of first linker moieties which have two functional groups and can react with the photoactive moieties include those having the structure of one of Formulas (30, (32), or (33):

Formula (30)

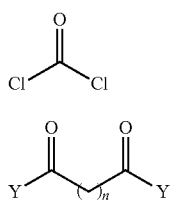

Formula (32)

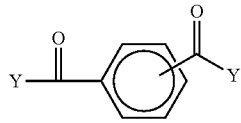

Formula (33)

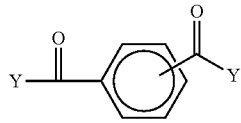

where Y is hydroxyl, halogen, alkoxy, or aryloxy; and where n is 1 to 20. It should be noted that Formula (33) encompasses isophthalic acid and terephthalic acid.

Some examples of linker moieties which have three functional groups and can react with the photoactive moieties include those having the structure of one of Formulas (36)-(38):

Formula (36)

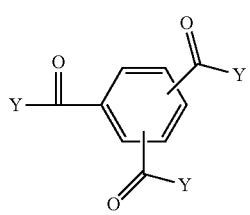

Formula (37)

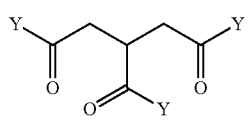

Formula (38)

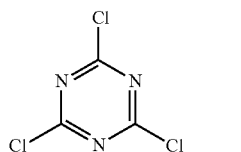

where Y is hydroxyl, halogen, alkoxy, or aryloxy.

Some examples of first linker moieties which have four functional groups and can react with the photoactive moieties include those having the structure of one of Formulas (39)-(41):

Formula (39)

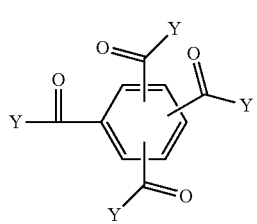

Formula (40)

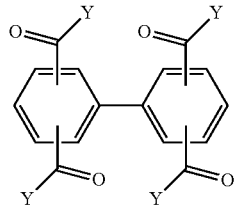

Formula (41)

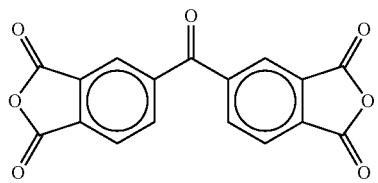

where Y is hydroxyl, halogen, alkoxy, or aryloxy.

In some embodiments, functional groups can be provided by short oligomers, including oligomers containing glycidyl methacrylate monomers with styrene or methacrylate monomers, or epoxidized novolac resins. These oligomers can permit the desired the number of functional groups to be provided. Such oligomers are generalized by the structure of Formula (42):

Formula (42)

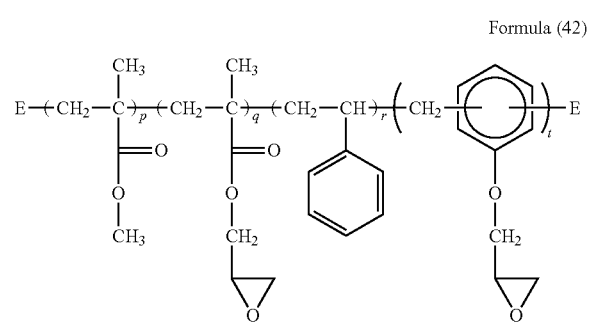

where E is hydrogen or an endcapping agent, p is the number of methacrylate monomers, q is the number of methacrylate monomers, r is the number of styrene monomers, and t is the number of epoxidized novolac (phenol-formaldehyde) monomers. Generally, p+q+r+t≤20. When the oligomer contains glycidyl methacrylate monomers with styrene or methacrylate monomers, generally t=0 and q≥1. Similarly, for novolac resins, p=q=r=0. The epoxy groups can be reacted with the phenolic group of the photoactive moiety.

In particularly desired embodiments, the photoactive additive can be formed from a reaction mixture containing the first photoactive moiety, the second photoactive moiety, the first linker moiety, and one or more diol chain extenders. The diol chain extender is a molecule that contains only two hydroxyl groups and is not photoactive when exposed to light. The chain extender can be used to provide a desired level of miscibility when the additive is mixed with other polymeric resins. The photoactive additive may comprise from about 75 wt % to about 99.5 wt %, or from 95 wt % to about 99 wt %, or from about 80 wt % to about 95 wt %, or from about 80 wt % to about 90 wt % of the diol chain extender.

A first exemplary diol chain extender is a bisphenol of Formula (B):

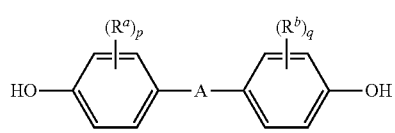

(B)

wherein $R^a$ and $R^b$ each represent a halogen atom or a monovalent hydrocarbon group and may be the same or different; p and q are each independently integers of 0 to 4; and A represents one of the groups of formula (B-1):

(B-1)

$$\begin{array}{ccc} & R^c & & R^e \\ & | & & \| \\ -\!\!-\!\!C\!\!-\!\!- & \text{or} & -\!\!-\!\!C\!\!-\!\!- \\ & | & & \\ & R^d & & \end{array}$$

wherein $R^c$ and $R^d$ each independently represent a hydrogen atom or a monovalent linear or cyclic hydrocarbon group and $R^e$ is a divalent hydrocarbon group. For example, A can be a substituted or unsubstituted $C_3$-$C_{18}$ cycloalkylidene.

Specific examples of the types of bisphenol compounds that may be represented by Formula (B) include 1,1-bis(4-hydroxyphenyl) methane, 1,1-bis(4-hydroxyphenyl)ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane; 4,4'-(1-phenylethane-1,1-diyl)diphenol or 1,1-bis(4-hydroxyphenyl)-1-phenyl-ethane (bisphenol-AP); and 1,1-bis(4-hydroxyphenyl)-3,3,5-trimethylcyclohexane (bisphenol TMC).

A second exemplary diol chain extender is a bisphenol of Formula (C):

(C)

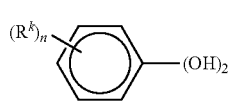

wherein each $R^k$ is independently a $C_{1-10}$ hydrocarbon group, and n is 0 to 4. The halogen is usually bromine. Examples of compounds that may be represented by Formula (C) include resorcinol, substituted resorcinol compounds such as 5-methyl resorcinol, 5-phenyl resorcinol, or 5-cumyl resorcinol; catechol; hydroquinone; and substituted hydroquinones such as 2-methyl hydroquinone, 2-t-butyl hydroquinone, 2-phenyl hydroquinone, 2-cumyl hydroquinone, or 2,3,5,6-tetramethyl hydroquinone.

A third exemplary diol chain extender is a bisphenoipolydiorganosiloxane of Formula (D-1) or (D-2):

(D-1)

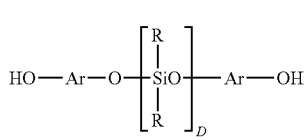

(D-2)

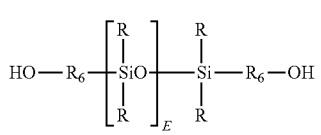

wherein each Ar is independently aryl; each R is independently alkyl, alkoxy, alkenyl, alkenyloxy, aryl, aryloxy, arylalkyl, or alkylaryl; each $R_6$ is independently a divalent $C_1$-$C_{30}$ organic group such as a $C_1$-$C_{30}$ alkyl, $C_1$-$C_{30}$ aryl, or $C_1$-$C_{30}$ alkylaryl; and D and E are an average value of 2 to about 1000, specifically about 2 to about 500, or about 10 to about 200, or more specifically about 10 to about 75.

Specific examples of Formulas (D-1) or (D-2) are illustrated below as Formulas (D-a) through (D-d):

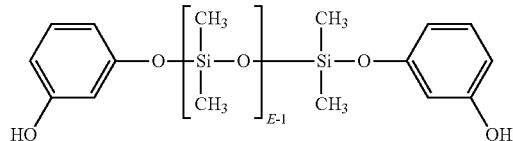
(D-a)

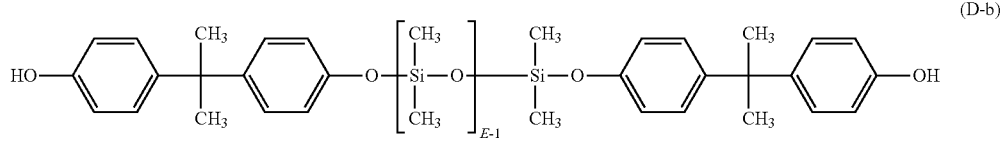
(D-b)

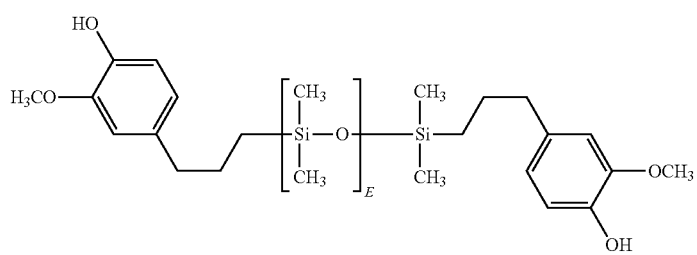
(D-c)

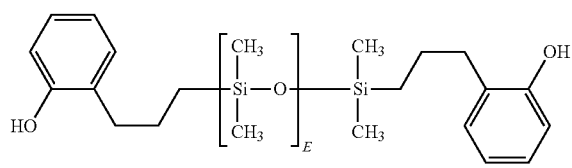
(D-d)

where E is an average value from 10 to 200.

A fourth exemplary diol chain extender is an aliphatic diol of Formula (E):

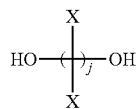
(E)

wherein each X is independently hydrogen, halogen, or alkyl; and j is an integer from 1 to 20. Examples of an aliphatic diol include ethylene glycol, propanediol, 2,2-dimethyl-propanediol, 1,6-hexanediol, and 1,12-dodecanediol.

A fifth exemplary diol chain extender is a dihydroxy compound of Formula (F), which may be useful for high heat applications:

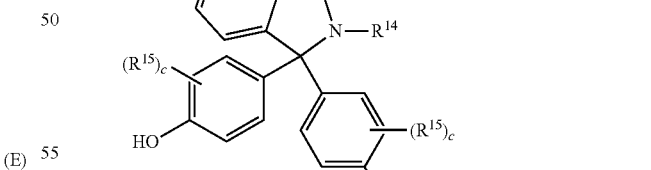
(F)

wherein $R^{13}$ and $R^{15}$ are each independently a halogen or a $C_1$-$C_6$ alkyl group, $R^{14}$ is a $C_1$-$C_6$ alkyl, phenyl, or phenyl substituted with up to five halogens or $C_1$-$C_6$ alkyl groups, and c is 0 to 4. In a specific embodiment, $R^{14}$ is a $C_1$-$C_6$ alkyl or phenyl group. In still another embodiment, $R^{14}$ is a methyl or phenyl group. In another specific embodiment, each c is 0. Compounds of Formula (F) include 3,3-bis(4-hydroxyphenyl)-2-phenylisoindolin-1-one (PPPBP).

Other dihydroxy compounds (i.e. diol chain extenders) that might impart high Tgs to the polycarbonate as a copolycarbonate are dihydroxy compounds having adamantane units, as described in U.S. Pat. Nos. 7,112,644 and 3,516,968, which are fully incorporated herein by reference. A compound having adamantane units may have repetitive units of the following formula (G) for high heat applications:

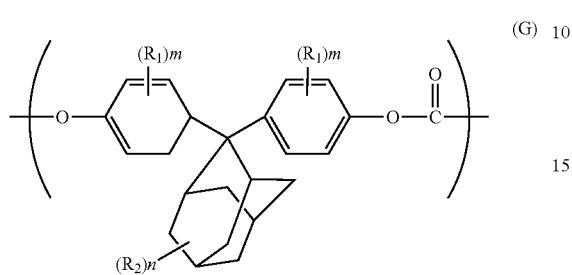

wherein $R_1$ represents a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms, or a fluoroalkyl group having 1 to 6 carbon atoms; $R_2$ represents a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms, or a fluoroalkyl group having 1 to 12 carbon atoms; m represents an integer of 0 to 4; and n represents an integer of 0 to 14.

Other dihydroxy compounds that might impart high Tgs to the polycarbonate as a copolycarbonate are dihydroxy compounds having fluorene-units, as described in U.S. Pat. No. 7,244,804. One such fluorene-unit containing dihydroxy compound is represented by the following formula (H) for high heat applications:

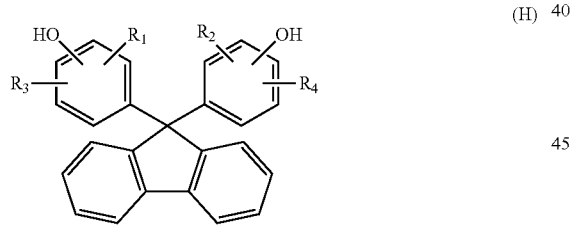

wherein $R_1$ to $R_4$ are each independently a hydrogen atom, a hydrocarbon group with 1 to 9 carbon atoms which may contain an aromatic group, or a halogen atom.

Another diol chain extender that could be used is an isosorbide. A monomer unit derived from isosorbide may be an isorbide-bisphenol unit of Formula (I):

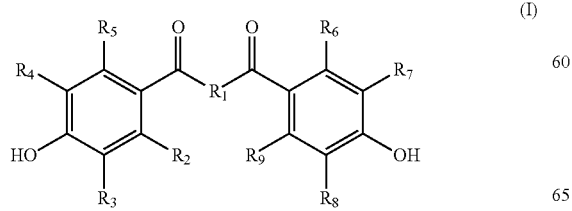

wherein $R_1$ is an isosorbide unit and $R_2$-$R_9$ are each independently a hydrogen, a halogen, a $C_1$-$C_6$ alkyl, a methoxy, an ethoxy, or an alkyl ester.

The $R_1$ isosorbide unit may be represented by Formula (I-a):

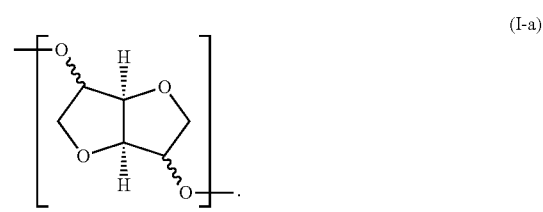

The isosorbide unit may be derived from an isosorbide, a mixture of isosorbide, a mixture of isomers of isosorbide, and/or from individual isomers of isosorbide. The stereochemistry for the isosorbide-based carbonate units of Formula (I) is not particularly limited. These diols may be prepared by the dehydration of the corresponding hexitols. Hexitols are produced commercially from the corresponding sugars (aldohexose). Aliphatic diols include 1,4:3,6-dianhydro-D glucitol; 1,4:3,6-dianhydro-D mannitol; and 1,4:3,6-dianhydro-L iditol; and any combination thereof. Isosorbides are available commercially from various chemical suppliers including Cargill, Roquette, and Shanxi. The isosorbide-bisphenol may have a pKa of between 8 and 11.

As previously explained, the first photoactive moiety and the second photoactive moiety are reacted with a first linker moiety to obtain the photoactive additive. In some embodiments, a secondary linker moiety is included in the reaction mixture. The secondary linker moiety has at least three functional groups, each of which can react with the functional groups of the first linker moiety, and acts as a branching agent. Generally, the functional groups of the secondary linker moiety are hydroxyl groups.

Some examples of secondary linker moieties which have three functional groups and can react with the first linker moiety include those having the structure of one of Formulas (43)-(46):

Formula (43)

Formula (44)

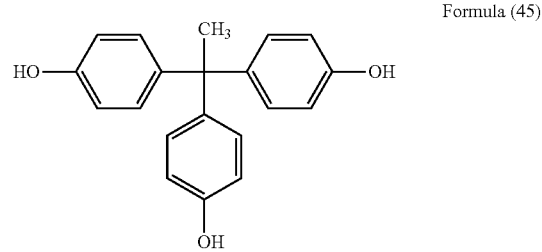
Formula (45)

-continued

Formula (46)

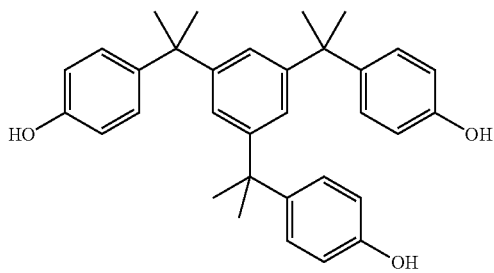

Some examples of secondary linker moieties which have four functional groups and can react with the first linker moiety include those having the structure of one of Formulas (47)-(48):

Formula (47)

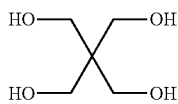

Formula (48)

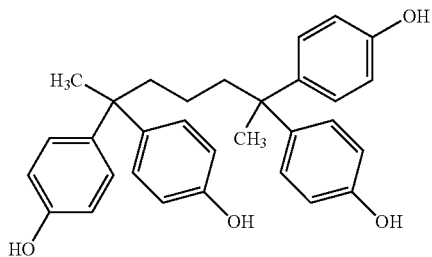

In some embodiments, the secondary linker moiety can be an oligomer, made from an epoxidized novolac monomer. These oligomers can permit the desired number of functional groups to be provided. Such oligomers are generalized by the structure of Formula (49):

Formula (49)

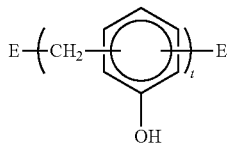

wherein E is hydrogen or an endcapping agent; and t is an integer from 1 to 20.

If desired, a second end-capping agent can also be used to terminate any polymer chains of the photoactive additive (i.e. in addition to the first photoactive moiety). The second end-capping agent (i.e. chain stopper) is not photoactive, and can be a monohydroxy compound, a mono-acid compound, or a mono-ester compound. Exemplary endcapping agents include phenol, p-cumylphenol (PCP), resorcinol monobenzoate, p-tert-butylphenol, octylphenol, p-cyanophenol, and p-methoxyphenol. If not modified with other adjectives, the term "end-capping agent" is used herein to denote a compound that is not photoactive when exposed to light. For example, the end-capping agent does not contain a ketone group. The photoactive additive may comprise about 0.5 mole % to about 5.0 mole % endcap groups derived from this second end-capping agent.

Depending on the selection of the first linker moiety, the resulting photoactive additive of the present disclosure may be a polyester-polycarbonate copolymer. The molar ratio of ester units to carbonate units in the polyester-polycarbonate may vary broadly, for example 1:99 to 99:1, specifically 10:90 to 90:10, more specifically 25:75 to 75:25, optionally expanded depending on the desired properties of the final composition. The polyester units may be derived from an aliphatic or aromatic dicarboxylic acid. Aliphatic dicarboxylic acids may have from 6 to about 36 carbon atoms, optionally from 6 to 20 carbon atoms. Exemplary aliphatic dicarboxylic acids include adipic acid, sebacic acid, 3,3-dimethyl adipic acid, 3,3,6-trimethyl sebacic acid, 3,3,5,5-tetramethyl sebacic acid, azelaic acid, dodecanedioic acid, dimer acids, cyclohexane dicarboxylic acids, dimethyl cyclohexane dicarboxylic acid, norbornane dicarboxylic acids, adamantane dicarboxylic acids, cyclohexene dicarboxylic acids, or $C_{14}$, $C_{18}$ and $C_{20}$ diacids. Exemplary aromatic dicarboxylic acids include isophthalic or terephthalic acid, 1,2-di(p-carboxyphenyl)ethane, 4,4'-dicarboxydiphenyl ether, 4,4'-bisbenzoic acid; 1,4-, 1,5-, or 2,6-naphthalenedicarboxylic acids; and combinations comprising at least one of the foregoing acids. A specific dicarboxylic acid mixture comprises a combination of isophthalic acid and terephthalic acid wherein the weight ratio of isophthalic acid to terephthalic acid is about 91:9 to about 2:98.

The polyester unit of a polyester-polycarbonate may be derived from the reaction of a combination of isophthalic and terephthalic diacids (or derivatives thereof) with resorcinol. In another embodiment, the polyester unit of a polyester-polycarbonate may be derived from the reaction of a combination of isophthalic acid and terephthalic acid with bisphenol-A. In an embodiment, the polycarbonate units may be derived from bisphenol-A. In another specific embodiment, the polycarbonate units may be derived from resorcinol and bisphenol-A in a molar ratio of resorcinol carbonate units to bisphenol-A carbonate units of 1:99 to 99:1.

The photoactive additives of the present disclosure can be a compound, an oligomer, or a polymer. The oligomer has a weight average molecular weight (Mw) of less than 15,000, including 10,000 or less. The polymeric photoactive additives of the present disclosure have a Mw of 15,000 or higher. In particular embodiments, the Mw is between 17,000 and 80,000 Daltons, or between 17,000 and 35,000 Daltons. These molecular weights are measured prior to any UV exposure. The Mw may be varied as desired. Polymers/oligomers with relatively higher Mw's generally retain their mechanical properties better, while polymers/oligomers with relatively lower Mw's generally have better flow properties. In some particular embodiments, the Mw of the photoactive additives is about 5,000 or less.

The product resulting from the reaction in FIG. 1 is illustrative of such photoactive additives. Here, the photoactive additive is formed from a first photoactive moiety, a second photoactive moiety, a first linker moiety, and a diol chain extender. 4-hydroxybenzophenone and 4,4'-dihydroxybenzophenone are reacted with phosgene and bisphenol-A to obtain the photoactive additive.

Figure 2:
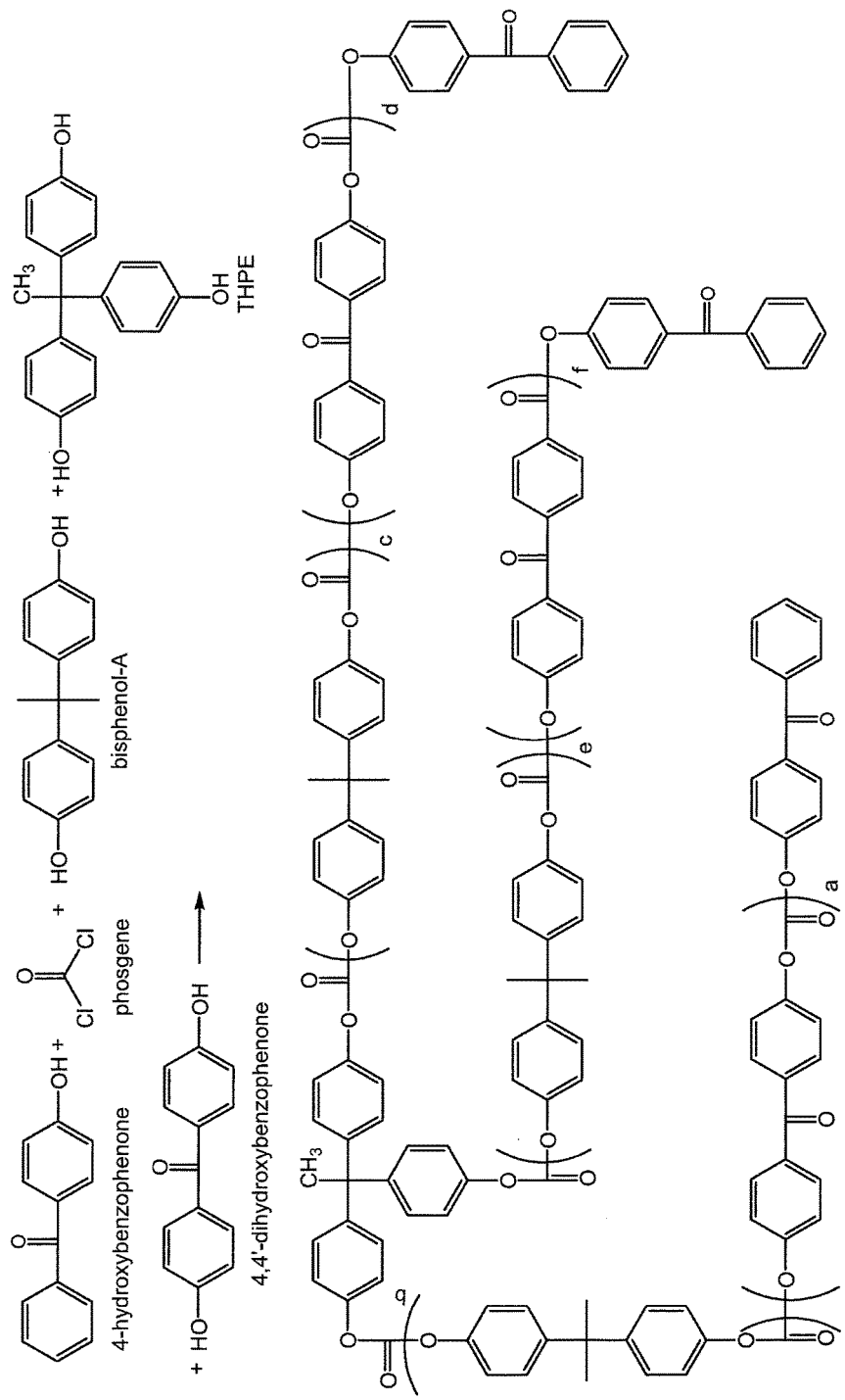
FIG. 2 illustrates the formation of a branched photoactive additive (oligomer/polymer) from a monofunctional photoactive moiety, a difunctional photoactive moiety, a first linker moiety, a diol chain extender, and a secondary linker moiety.

An example of a photoactive additive formed from a first photoactive moiety, a second photoactive moiety, a first linker moiety, a diol chain extender, and a secondary linker moiety, is seen in FIG. 2. Here, 4-hydroxybenzophenone (first photoactive moiety) and 4,4'-dihydroxybenzophenone (second photoactive moiety) are reacted with phosgene (first linker moiety), bisphenol-A (diol chain extender), and tris (hydroxyphenyl)ethane (THPE, secondary linker moiety) to obtain the photoactive additive. Note that the THPE (secondary linker moiety) reacts with the phosgene (first linker moiety), not with either of the photoactive benzophenones. The resulting photoactive additive (PAA) may be an oligomer or a polymer with a weight average molecular weight and a polydispersity index.

Figure 3:
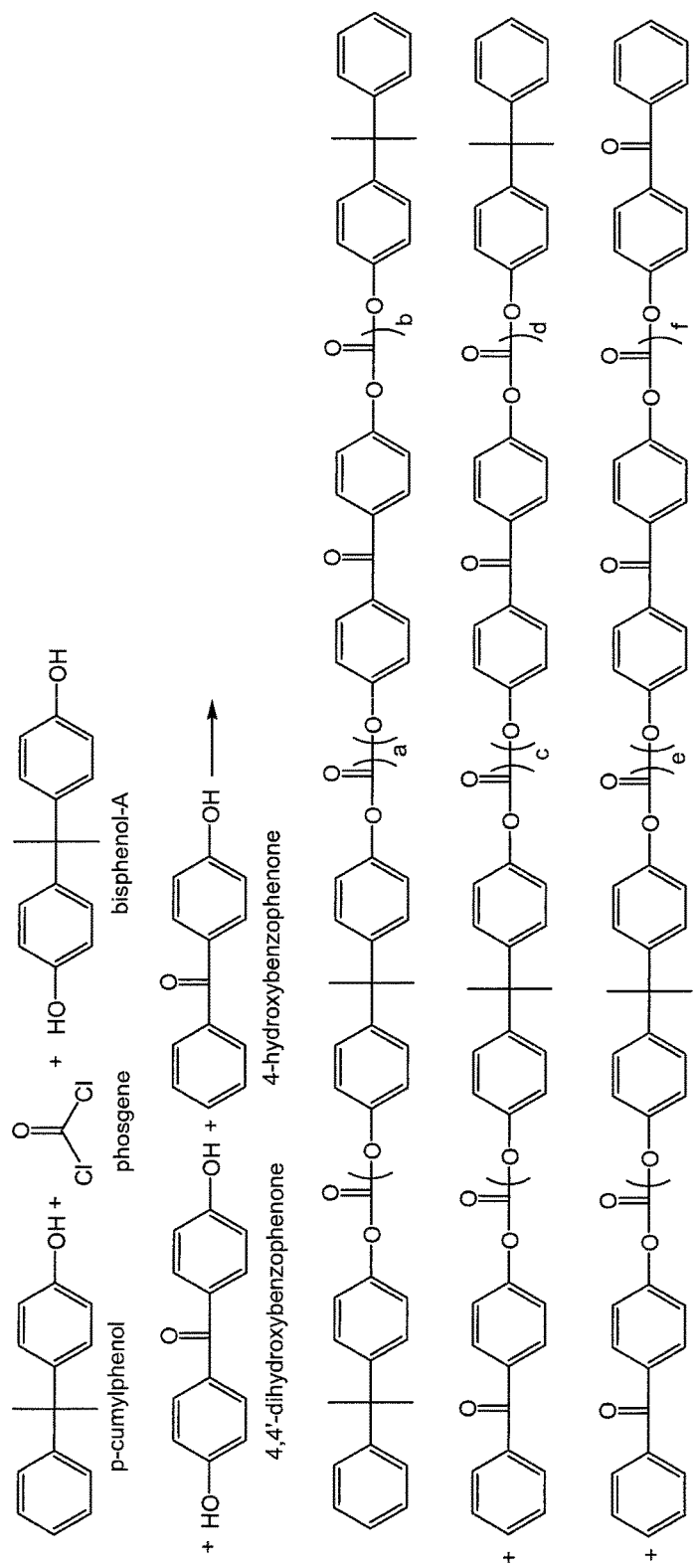
FIG. 3 illustrates the formation of a photoactive additive (oligomer/polymer) from a monofunctional photoactive moiety, a difunctional photoactive moiety, a first linker moiety, a diol chain extender, and a second end-capping agent (non-photoactive).

An example of a photoactive additive formed from a first photoactive moiety, a second photoactive moiety, a first linker moiety, a diol chain extender, and a second endcapping agent is seen in FIG. 3. Here, 4-hydroxybenzophenone (first photoactive moiety) and 4,4'-dihydroxybenzophenone (second photoactive moiety) are reacted with phosgene (first linker moiety), bisphenol-A (diol chain extender), and p-cumylphenol (second end-capping agent) to obtain the photoactive additive. Some chains will have two photoactive 4-hydroxybenzophenone endcaps, some will have only one 4-hydroxybenzophenone endcap, and some will have zero 4-hydroxybenzophenone endcap, distributed in a statistical fashion.

Figure 4:
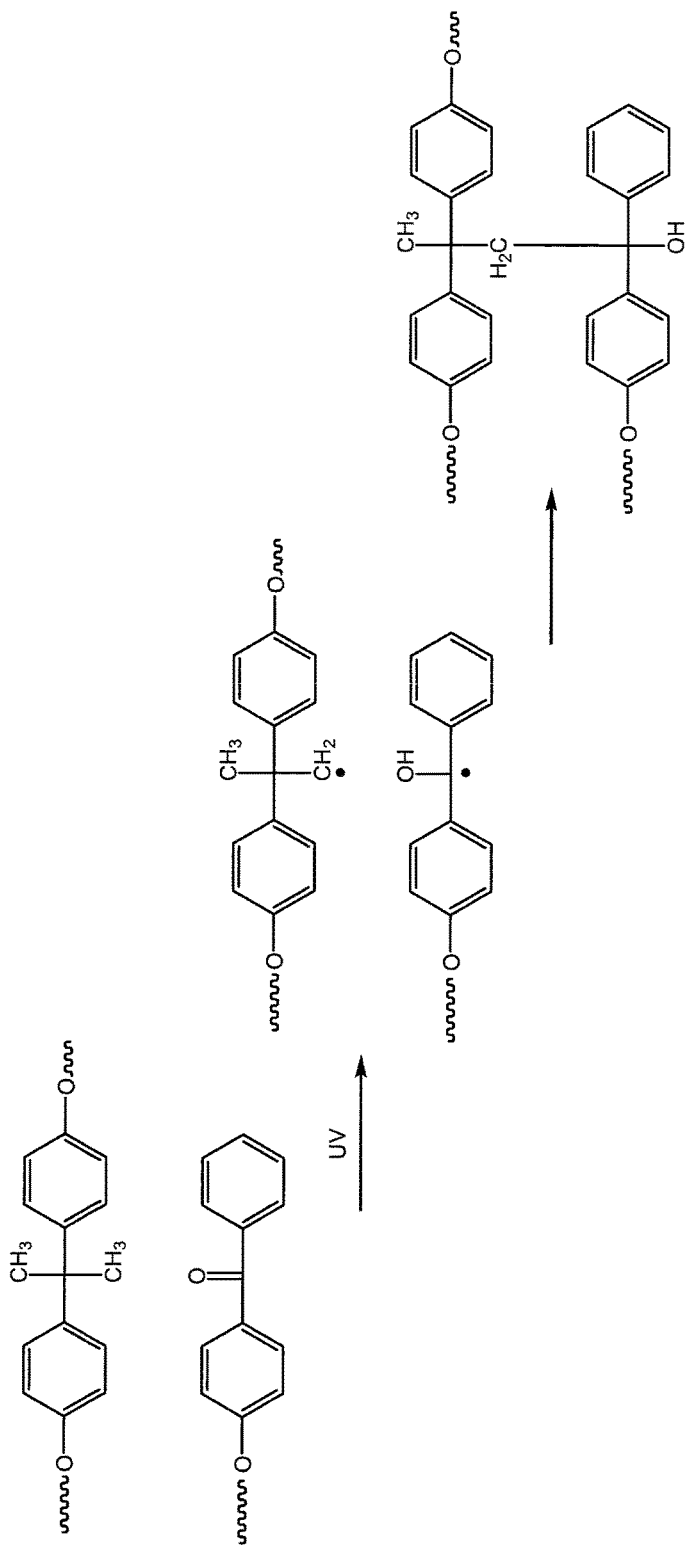
FIG. 4 illustrates the crosslinking mechanism of the photoactive additive.

One crosslinking mechanism of the additives is believed to be due to hydrogen abstraction by the ketone group from an alkyl group that acts as a hydrogen donor and subsequent coupling of the resulting radicals. This mechanism is illustrated in FIG. 4 with reference to a benzophenone (the photoactive moiety) and a bisphenol-A (BPA) monomer. Upon exposure to UV, the oxygen atom of the benzophenone abstracts a hydrogen atom from a methyl group on the BPA monomer and becomes a hydroxyl group. The methylene group then forms a covalent bond with the carbon of the ketone group. Put another way, the ketone group of the benzophenone could be considered to be a photoactive group. It should be noted that the presence of an abstractable hydrogen is critical for this reaction to occur. Other mechanisms may occur after the initial abstraction event with base resins containing unsaturated bonds or reactive side groups.

In particular embodiments, the photoactive additives (PAAs) disclosed herein are cross-linkable polycarbonates comprising repeating units derived from a dihydroxybenzophenone monomer (i.e. of Formula (17)), and containing endcaps derived from a monohydroxybenzophenone (i.e. of Formula (1)). These polycarbonates, prior to cross-linking, can be provided as thermally stable high melt-flow polymers, and can thus be used to fabricate a variety of thin-walled products (e.g., 3 mm or less). These products may subsequently be treated (e.g., with UV-radiation) to affect cross-linking, thereby providing thin-walled materials that meet desired performance requirements (e.g., 5VA performance, chemical resistance, transparency). The cross-linked materials, in addition to flame resistance and chemical resistance, may retain or exhibit superior mechanical properties (e.g., impact resistance, ductility) as compared to the composition prior to cross-linking.

The benzophenones of the cross-linkable polycarbonates provide a photoactive ketone group for cross-linking the polycarbonates. Treatment of a cross-linkable polycarbonate of the present disclosure with a suitable dose of UV radiation initiates a cross-linking reaction between the dihydroxybenzophenone carbonyl carbon and the carbon atom of another functional group (e.g., a methylene carbon atom, such as in bisphenol-A) in the same polymer or another polymer in the composition.

The cross-linkable polycarbonates of the present disclosure include homopolycarbonates, copolymers comprising different moieties in the carbonate (referred as "copolycarbonates"), copolymers comprising carbonate units and other types of polymer units such as polyester units, polysiloxane units, and combinations comprising at least one homopolycarbonate and copolycarbonate. For reference, the term "dipolymer" refers to copolymers derived specifically from two different monomers, and the term "terpolymer" refers to copolymers derived specifically from three different monomers If the cross-linkable polycarbonate is a copolymer, the monomers may be randomly incorporated into the polycarbonate. A random copolymer may have several block sequences and alternate sequences that follow a statistical distribution. In a random x:(1−x) copolymer, wherein x is the mole percent of a first monomer and 1−x is the mole percent of the other monomers, one can calculate the distribution of each monomer using peak area values determined by $^{13}$C NMR, for example. The copolymer can be an alternating copolymer with alternating I and O units (-I-O-I-O-I-O-I-O-), or I and O units arranged in a repeating sequence (e.g. a periodic copolymer having the formula:(I-O-I-O-O-I-I-I-I-O-O-O-)n) The cross-linkable polycarbonate copolymer may be a statistical copolymer in which the sequence of monomer residues follows a statistical rule. The copolymer may also be a block copolymer that comprises two or more homopolymer subunits linked by covalent bonds (-I-I-I-I-I-O-O-O-O-O-). The union of the homopolymer subunits may require an intermediate non-repeating subunit, known as a junction block. Block copolymers with two or three distinct blocks are called diblock copolymers and triblock copolymers, respectively.

The cross-linkable polycarbonates (also referred to as "non-cross-linked polycarbonates") may comprise about 0.5 mol % to about 5 mol % endcap groups derived from the monohydroxybenzophenone, about 1 mol % to about 3 mol % endcap groups derived from the monohydroxybenzophenone, about 1.7 mol % to about 2.5 mol % endcap groups derived from the monohydroxybenzophenone, about 2 mol % to about 2.5 mol % endcap groups derived from the monohydroxybenzophenone, or about 2.5 mol % to about 3.0 mol % endcap groups derived from the monohydroxybenzophenone. The cross-linkable polycarbonates may have a monohydroxybenzophenone derived endcap content of: 0.5 mol %, 0.6 mol %, 0.7 mol %, 0.8 mol %, 0.9 mol %, 1.0 mol %, 1.1 mol %, 1.2 mol %, 1.3 mol %, 1.4 mol %, 1.5 mol %, 1.6 mol %, 1.7 mol %, 1.8 mol %, 1.9 mol %, 2.0 mol %, 2.1 mol %, 2.2 mol %, 2.3 mol %, 2.4 mol %, 2.5 mol %, 2.6 mol %, 2.7 mol %, 2.8 mol %, 2.9 mol %, 3.0 mol %, 3.1 mol %, 3.2 mol %, 3.3 mol %, 3.4 mol %, 3.5 mol %, 3.6 mol %, 3.7 mol %, 3.8 mol %, 3.9 mol %, 4.0 mol %, 4.1 mol %, 4.2 mol %, 4.3 mol %, 4.4 mol %, 4.5 mol %, 4.6 mol %, 4.7 mol %, 4.8 mol %, 4.9 mol %, or 5.0 mol %.

The cross-linkable polycarbonates of the present disclosure contain from about 0.5 mole % to about 50 mole % of the dihydroxybenzophenone monomer (i.e. repeating units derived from the dihydroxybenzophenone monomer). In more specific embodiments, the polymers contain from about 1 mole % to about 3 mole %, or from about 1 mole % to about 6 mole %, from about 10 mole % to about 25 mole %, or from about 0.5 mole % to about 25 mole % of the dihydroxybenzophenone monomer.

The cross-linkable polycarbonates of the present disclosure may have a weight average molecular weight (Mw) of 15,000 to about 80,000 Daltons [±1,000 Daltons], or of 15,000 to about 35,000 Daltons [±1,000 Daltons], or of about 20,000 to about 30,000 Daltons [±1,000 Daltons]. In certain embodiments, the cross-linkable polycarbonates have weight average molecular weights of about 16,000 Daltons [±1,000 Daltons], about 17,000 Daltons [±1,000 Daltons], about 18,000 Daltons [±1,000 Daltons], about 19,000 Daltons [±1,000 Daltons], about 20,000 Daltons [±1,000 Daltons], about 21,000 Daltons [±1,000 Daltons], about 22,000 Daltons [±1,000 Daltons], about 23,000 Daltons [±1,000 Daltons], about 24,000 Daltons [±1,000 Daltons], about 25,000 Daltons [±1,000 Daltons], about 26,000 Daltons [±1,000 Daltons], about 27,000 Daltons [±1,000 Daltons], about 28,000 Daltons [±1,000 Daltons], about 29,000 Daltons [±1,000 Daltons], about 30,000 Daltons [±1,000 Daltons], about 31,000 Daltons [±1,000 Daltons], about 32,000 Daltons [±1,000 Daltons], about 33,000 Daltons [±1,000 Daltons], about 34,000 Daltons [±1,000 Daltons], or about 35,000 Daltons [±1,000 Daltons]. In additional embodiments, the cross-linkable polycarbonates have a Mw of 17,000 to about 80,000 Daltons. Molecular weight determinations may be performed using gel permeation chromatography (GPC), using a cross-linked styrene-divinylbenzene column and calibrated to polycarbonate references using a UV-VIS detector set at 264 nm, or alternatively using a refractive index detector. Samples may be prepared at a concentration of about 1 mg/ml, and eluted at a flow rate of about 1.0 ml/min.

The cross-linkable polycarbonates of the present disclosure may have a polydispersity index (PDI) of about 2.0 to about 5.0, about 2.0 to about 3.0, or about 2.0 to about 2.5, or about 2.0 to about 3.5. The PDI is measured prior to any UV exposure.

It is noted that the molecular weight (both weight-average and number-average) of the photoactive additive/cross-linkable polycarbonate can be measured using two different kinds of detectors. More specifically, the molecular weight can be measured using an ultraviolet (UV) detector or using a refractive index (RI) detector, using GPC and calibrated to polycarbonate standards for both detectors. The UV detector overweights the presence of low-molecular-weight chains due to the higher extinction coefficient of the monohydroxybenzophenone in the UV detector. This does not occur in the RI detector, and so the PDI as measured by the RI detector is generally lower than the PDI as measured by the UV detector.

In embodiments, the ratio of the polydispersity index (PDI) measured using a UV detector to the PDI measured using an RI detector is 1.4 or less, when using a GPC method and polycarbonate molecular weight standards. The ratio may also be 1.2 or less, or 1.1 or less.

The cross-linkable polycarbonates of the present disclosure may have a melt flow rate (often abbreviated MFR), which measures the rate of extrusion of a composition through an orifice at a prescribed temperature and load. In certain embodiments, the polycarbonates may have an MFR of 1 to 40 grams/10 min, 6 to 15 grams/10 min, 6 to 8 grams/10 min, 6 to 12 grams/10 min, 2 to 30 grams/10 min, 5 to 30 grams/10 min, 8 to 12 grams/10 min, 8 to 10 grams/10 min, or 20 to 30 grams/10 min, using the ASTM D1238 method, 1.2 kg load, 300° C. temperature, 360 second dwell.

The cross-linkable polycarbonates of the present disclosure may have a glass transition temperature (Tg) of greater than 120° C., 125° C., 130° C., 135° C., 140° C., 145° C., 150° C., 155° C., 160° C., 165° C., 170° C., 175° C., 180° C., 185° C., 190° C., 200° C., 210° C., 220° C., 230° C., 240° C., 250° C., 260° C., 270° C., 280° C., 290° C., or 300° C., as measured using a differential scanning calorimetry method. In certain embodiments, the polycarbonates have glass transition temperatures ranging from about 120° C. to about 230° C., about 140° C. to about 160° C., about 145° C. to about 155° C., about 148° C. to about 152° C., or about 149° C. to about 151° C.

The cross-linkable polycarbonates of the present disclosure may have a biocontent of 2 wt % to 90 wt %; 5 wt % to 25 wt %; 10 wt % to 30 wt %; 15 wt % to 35 wt %; 20 wt % to 40 wt %; 25 wt % to 45 wt %; 30 wt % to 50 wt %; 35 wt % to 55 wt %; 40 wt % to 60 wt %; 45 wt % to 65 wt %; 55 wt % to 70% wt %; 60 wt % to 75 wt %; 50 wt % to 80 wt %; or 50 wt % to 90 wt %. The biocontent may be measured according to ASTM D6866.

The cross-linkable polycarbonates of the present disclosure may have a modulus of elasticity of greater than or equal to 2200 megapascals (MPa), greater than or equal to 2310 MPa, greater than or equal to 2320 MPa, greater than or equal to 2330 MPa, greater than or equal to 2340 MPa, greater than or equal to 2350 MPa, greater than or equal to 2360 MPa, greater than or equal to 2370 MPa, greater than or equal to 2380 MPa, greater than or equal to 2390 MPa, greater than or equal to 2400 MPa, greater than or equal to 2420 MPa, greater than or equal to 2440 MPa, greater than or equal to 2460 MPa, greater than or equal to 2480 MPa, greater than or equal to 2500 MPa, or greater than or equal to 2520 MPa as measured by ASTM D 790 at 1.3 mm/min, 50 mm span.

In embodiments, the cross-linkable polycarbonates of the present disclosure may have a flexural modulus of 2,200 to 2,500, preferably 2,250 to 2,450, more preferably 2,300 to 2,400 MPa. In other embodiments, the cross-linkable polycarbonates of the present disclosure may have a flexural modulus of 2,300 to 2,600, preferably 2,400 to 2,600, more preferably 2,450 to 2,550 MPa. The flexural modulus is also measured by ASTM D790.

The cross-linkable polycarbonates of the present disclosure may have a tensile strength at break of greater than or equal to 60 megapascals (MPa), greater than or equal to 61 MPa, greater than or equal to 62 MPa, greater than or equal to 63 MPa, greater than or equal to 64 MPa, greater than or equal to 65 MPa, greater than or equal to 66 MPa, greater than or equal to 67 MPa, greater than or equal to 68 MPa, greater than or equal to 69 MPa, greater than or equal to 70 MPa, greater than or equal to 71 MPa, greater than or equal to 72 MPa, greater than or equal to 73 MPa, greater than or equal to 74 MPa, greater than or equal to 75 MPa as measured by ASTM D 638 Type I at 50 mm/min.

The cross-linkable polycarbonates of the present disclosure may possess a ductility of greater than or equal to 60%, greater than or equal to 65%, greater than or equal to 70%, greater than or equal to 75%, greater than or equal to 80%, greater than or equal to 85%, greater than or equal to 90%, greater than or equal to 95%, or 100% in a notched izod test at −20° C., −15° C., −10° C., 0° C., 5° C., 10° C., 15° C., 20° C., 23° C., 25° C., 30° C., or 35° C. at a thickness of 3.2 mm according to ASTM D 256-10.

The cross-linkable polycarbonates of the present disclosure may have a notched Izod impact strength (NII) of greater than or equal to 500 J/m, greater than or equal to 550 J/m, greater than or equal to 600 J/m, greater than or equal to 650 J/m, greater than or equal to 700 J/m, greater than or equal to 750 J/m, greater than or equal to 800 J/m, greater than or equal to 850 J/m, greater than or equal to 900 J/m, greater than or equal to 950 J/m, or greater than or equal to 1000 J/m, measured at 23° C. according to ASTM D 256.

The cross-linkable polycarbonates of the present disclosure may have a heat distortion temperature of greater than or equal to 110° C., 111° C., 112° C., 113° C., 114° C., 115° C., 116° C., 117° C., 118° C., 119° C., 120° C., 121° C., 122°

C., 123° C., 124° C., 125° C., 126° C., 127° C., 128° C., 129° C., 130° C., 131° C., 132° C., 133° C., 134° C., 135° C., 136° C., 137° C., 138° C., 139° C., 140° C., 141° C., 142° C., 143° C., 144° C., 145° C., 146° C., 147° C., 148° C., 149° C., 150° C., 151° C., 152° C., 153° C., 154° C., 155° C., 156° C., 157° C., 158° C., 159° C., 160, 161° C., 162° C., 163° C., 164° C., 165° C., 166° C., 167° C., 168° C., 169° C., or 170° C., as measured according to ASTM D 648 at 1.82 MPa, with 3.2 mm thick unannealed mm bar.

The cross-linkable polycarbonates of the present disclosure may have a percent haze value of less than or equal to 10.0%, less than or equal to 8.0%, less than or equal to 6.0%, less than or equal to 5.0%, less than or equal to 4.0%, less than or equal to 3.0%, less than or equal to 2.0%, less than or equal to 1.5%, less than or equal to 1.0%, or less than or equal to 0.5% as measured at a certain thickness according to ASTM D 1003-07. The polycarbonate haze may be measured at a 2.0, 2.2, 2.4, 2.54, 2.6, 2.8, 3.0, 3.2, 3.4, 3.6, 3.8, or a 4.0 millimeter thickness. The polycarbonate may be measured at a 0.125 inch thickness.

The polycarbonate may have a light transmittance greater than or equal to 50%, greater than or equal to 60%, greater than or equal to 65%, greater than or equal to 70%, greater than or equal to 75%, greater than or equal to 80%, greater than or equal to 85%, greater than or equal to 90%, greater than or equal to 95%, greater than or equal to 96%, greater than or equal to 97%, greater than or equal to 98%, greater than or equal to 99%, greater than or equal to 99.1%, greater than or equal to 99.2%, greater than or equal to 99.3%, greater than or equal to 99.4%, greater than or equal to 99.5%, greater than or equal to 99.6%, greater than or equal to 99.7%, greater than or equal to 99.8%, or greater than or equal to 99.9%, as measured at certain thicknesses according to ASTM D 1003-07. The polycarbonate transparency may be measured at a 2.0, 2.2, 2.4, 2.6, 2.8, 3.0, 3.2, 3.4, 3.6, 3.8, or a 4.0 millimeter thickness.

In particular embodiments, the photoactive cross-linkable polycarbonate resin is a copolymer formed from a monohydroxybenzophenone, a dihydroxybenzophenone, a diol chain extender, and phosgene. Most desirably, the monohydroxybenzophenone is 4-hydroxybenzophenone and the dihydroxybenzophenone is 4,4'-dihydroxybenzophenone. In preferred embodiments, the diol chain extender is bisphenol-A. Sometimes one or more non-photoactive end-capping agents are also used, and in such embodiments, a desirable end-capping agent is p-cumylphenol. The resulting photoactive additive (i.e. cross-linkable polycarbonate resin) comprises from about 0.5 mol % to 50 mole % of the dihydroxybenzophenone, from about 0.5 mol % to 5 mole % of endcaps derived from the monohydroxybenzophenone, and from about 50 mol % to 99.5 mole % of the bisphenol-A.

Processes

An interfacial polycondensation polymerization process for bisphenol-A (BPA) based polycarbonates can be used to prepare the photoactive additives (PAAs) of the present disclosure. Although the reaction conditions for interfacial polymerization can vary, an exemplary process generally involves dissolving or dispersing one or more dihydric phenol reactants (e.g. the dihydroxybenzophenone, bisphenol-A) in water, adding the resulting mixture to a water-immiscible solvent medium, and contacting the reactants with a carbonate precursor (e.g. phosgene) in the presence of a catalyst (e.g. triethylamine, TEA).

This process typically produces polycarbonates with a polydispersity index (PDI) of less than 3. A higher PDI can indicate an increased low molecular weight fraction in the product. Increased low molecular weight fraction can lead to difficulties in extrusion and injection molding processes by altering the flow behavior or causing the low molecular weight components to volatilize out of the material.

Four different processes are disclosed herein for producing some embodiments of the photoactive additive which contain carbonate linkages. Each process includes the following ingredients: a dihydroxybenzophenone, a diol chain extender, a monohydroxybenzophenone, a base, a carbonate precursor, a tertiary amine catalyst, water, and a water-immiscible organic solvent, and optionally an end-capping agent and/or a branching agent. The monohydroxybenzophenone and dihydroxybenzophenone are both photoactive moieties. It should be noted that more than one of each ingredient can be used to produce the photoactive additive. Some information on each ingredient is first provided below.

The dihydroxybenzophenone is a photoactive moiety, and has been previously described. For example, the dihydroxybenzophenone can have the structure of any one of Formulas (16)-(21), or (26)-(29). If desired, more than one dihydroxybenzophenone can be used. In particular embodiments for producing a cross-linkable polycarbonate, the dihydroxybenzophenone is 4,4'-dihydroxybenzophenone of Formula (17).

The diol chain extender may have the structure of any one of Formulas (B)-(H), and include monomers such as bisphenol-A.

The monohydroxybenzophenone is a photoactive moiety, and has been previously described. For example, the monohydroxybenzophenone can have the structure of any one of Formulas (1), (3), (5)-(10), (13), or (14). If desired, more than one monohydroxybenzophenone can be used. In particular embodiments for producing a cross-linkable polycarbonate, the monohydroxybenzophenone is 4-hydroxybenzophenone of Formula (1).

The optional end-capping agent is a monofunctional compound that is not photoactive. Examples of such end-capping agents include phenol, p-cumylphenol (PCP), p-tert-butylphenol, octylphenol, and p-cyanophenol.

The carbonate precursor may be, for example, a carbonyl halide such as carbonyl dibromide or carbonyl dichloride (also known as phosgene), or a haloformate such as a bishaloformate of a dihydric phenol (e.g., the bischloroformate of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In certain embodiments, the carbonate precursor is phosgene, a triphosgene, diacyl halide, dihaloformate, dicyanate, diester, diepoxy, diarylcarbonate, dianhydride, diacid chloride, or any combination thereof. An interfacial polymerization reaction to form carbonate linkages may use phosgene as a carbonate precursor, and is referred to as a phosgenation reaction. Many such carbonate precursors correspond to a structure of Formulas (30, (32), or (33), i.e. a first linker moiety.

The base is used for the regulation of the pH of the reaction mixture. In particular embodiments, the base is an alkali metal hydroxide, such as sodium hydroxide (NaOH) or potassium hydroxide (KOH).

A tertiary amine catalyst is used for polymerization. Exemplary tertiary amine catalysts that can be used are aliphatic tertiary amines such as triethylamine (TEA)), N-ethylpiperidine, 1,4-diazabicyclo[2.2.2]octane (DABCO), tributylamine, cycloaliphatic amines such as N,N-diethyl-cyclohexylamine and aromatic tertiary amines such as N,N-dimethylaniline.

Sometimes, a phase transfer catalyst is also used. Among the phase transfer catalysts that can be used are catalysts of the formula $(R^{30})_4Q^+X$, wherein each $R^{30}$ is the same or different, and is a $C_1$-$C_{10}$ alkyl group; Q is a nitrogen or phosphorus atom; and X is a halogen atom, $C_1$-$C_8$ alkoxy group, or $C_6$-$C_{18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_1$-$C_8$ alkoxy group or a $C_6$-$C_{18}$ aryloxy group, such as methyltributylammonium chloride.

The most commonly used water-immiscible solvents include methylene chloride, 1,2-dichloroethane, chlorobenzene, toluene, and the like.

The secondary linker moieties of any one of Formulas (43)-(49) can be used as branching agents.

In the first process, sometimes referred to as the "upfront" process, the dihydroxybenzophenone, diol chain extender, monohydroxybenzophenone, catalyst, water, and water-immiscible solvent are combined upfront in a vessel to form a reaction mixture. The reaction mixture is then exposed to the carbonate precursor, for example by phosgenation, while the base is co-added to regulate the pH, to obtain the photoactive additive.

To form a cross-linkable polycarbonate using this upfront process, the reaction mixture comprises a dihydroxybenzophenone, a diol chain extender, a monohydroxybenzophenone, a tertiary amine catalyst, water, and water-immiscible solvent. In more specific embodiments, the dihydroxybenzophenone is 4,4'-dihydroxybenzophenone, the diol chain extender is bisphenol-A, the monohydroxybenzophenone is 4-hydroxybenzophenone, and the water-immiscible solvent is methylene chloride. The phase transfer catalyst, when used, is methyltributylammonium chloride. The end-capping agent (when present) may be phenol, p-t-butylphenol, p-cumylphenol, octylphenol, or p-cyanophenol. The pH of the reaction mixture is usually from about 8.5 to about 10, and can be maintained by using a basic solution (e.g. aqueous NaOH). The reaction mixture is then charged with the carbonate precursor, which is usually phosgene. The carbonate precursor is added to the reaction mixture over a period of about 15 minutes to about 45 minutes. While the carbonate precursor is being added, the pH is also maintained in the range of about 8.5 to about 10, again by addition of a basic solution as needed. The cross-linkable polycarbonate is thus obtained, and is then isolated from the reaction mixture.

In the second process, also known as the "solution addition" process, the dihydroxybenzophenone, diol chain extender, tertiary amine catalyst, water, and water-immiscible solvent are combined in a vessel to form a reaction mixture. The total charge of the carbonate precursor is then added to this reaction mixture in the vessel over a total time period of about 15 minutes to about 45 minutes, while the base is co-added to regulate the pH. The carbonate precursor is first added to the reaction mixture along with the base to regulate the pH for a first time period that ranges from about 2 minutes to about 20 minutes. After the first time period ends, the monohydroxybenzophenone is added in a controlled manner to the reaction mixture, also referred to as programmed addition. The addition of the monohydroxybenzophenone occurs for a second time period after the first time period, rather than as a bolus at the beginning of the reaction (as in the upfront process). The carbonate precursor and the base are also added concurrently with the monohydroxybenzophenone during the second time period. After the second time period ends, the remainder of the carbonate precursor continues uninterrupted for a third time period until the total charge is reached. The base is also co-added during the third time period to regulate the reaction pH. The monohydroxybenzophenone is not added during either the first time period or the third time period. The photoactive additive is thus obtained. The total time period for the reaction is the sum of the first time period, the second time period, and the third time period. In particular embodiments, the second time period in which the solution containing the monohydroxybenzophenone is added to the reaction mixture begins at a point between 10% to about 40% of the total time period. Put another way, the first time period is 10% of the total time period.

To form a cross-linkable polycarbonate using this solution addition process, the reaction mixture comprises the dihydroxybenzophenone, diol chain extender, tertiary amine catalyst, water, and water-immiscible solvent. In more specific embodiments, the dihydroxybenzophenone is 4,4'-hydroxybenzophenone, the diol chain extender is bisphenol-A, and the water-immiscible solvent is methylene chloride. The pH of the reaction mixture is usually from about 8.5 to about 10, and can be maintained by using a basic solution (e.g. aqueous NaOH, made from the base).

The monohydroxybenzophenone is separately dissolved in a solvent to form a solution which is then added to the reaction mixture. The solvent in this solution can be the same as the water-immiscible solvent (e.g. methylene chloride). Alternatively, the solvent can be water that contains a base, so that the solution is a dilute aqueous basic solution. The base may be, for example, NaOH, or other similar bases. In embodiments, the dilute aqueous basic solution contains from about 1 to about 2 moles of the base per mole of the end-capping agent, and contains from about 5 wt % to about 20 wt % of the monohydroxybenzophenone.

The reaction mixture is then charged with the carbonate precursor, which is usually phosgene. The carbonate precursor is added to the reaction mixture over a total time period, which may be for example from about 15 minutes to about 45 minutes. The total time period is the duration needed to add the total charge of the carbonate precursor (measured either by weight or by moles) to the reaction mixture. While the carbonate precursor is being added, the pH is also maintained in the range of about 8.5 to about 10, again by addition of a basic solution as needed. It is contemplated that the carbonate precursor is added at a constant rate over the total time period.

The carbonate precursor is first added to the reaction mixture along with the base to regulate the pH for a first time period, ranging from about 2 minutes to about 20 minutes. Then, during a second time period, the solution containing the monohydroxybenzophenone is added to the reaction mixture concurrently with the carbonate precursor and the base. It is contemplated that the monohydroxybenzophenone is added at a constant rate during this second time period, which can range from about 1 minute to about 5 minutes. After the second time period ends, the remaining carbonate precursor is charged to the reaction mixture for a third time period, along with the base to regulate the reaction pH. The cross-linkable polycarbonate is thus obtained, and is then isolated from the reaction mixture.

The total time period for the reaction is the sum of the first time period, the second time period, and the third time period. In particular embodiments, the second time period in which the solution containing the monohydroxybenzophenone is added to the reaction mixture begins at a point between 10% to about 40% of the total time period. Put another way, the first time period is 10% of the total time period.

The third process is also referred to as a bis-chloroformate or chlorofomate (BCF) process. Chloroformate oligomers are prepared by reacting the carbonate precursor, specifically phosgene, with the dihydroxybenzophenone and the diol chain extender in the absence of the tertiary amine catalyst, while the base is co-added to regulate the pH. The chloroformate oligomers can contain a mixture of monochloroformates, bischloroformates, and bisphenol terminated oligomers. After the chloroformate oligomers are generated, the phosgene can optionally be allowed to substantially condense or hydrolyze, then the end-capping agent is added to the chloroformate mixture. The reaction is allowed to proceed, and the tertiary amine catalyst is added to complete the reaction.

To form a cross-linkable polycarbonate using the BCF addition process, the reaction mixture comprises the dihydroxybenzophenone, diol chain extender, water, and water-immiscible solvent. In more specific embodiments, the dihydroxybenzophenone is 4,4'-dihydroxybenzophenone, the carbonate precursor is phosgene, the diol chain extender is bisphenol-A, and water-immiscible solvent is methylene chloride. The pH of the reaction mixture is usually from about 8 to about 9 prior to the addition of the phosgene. During the addition of the phosgene, the pH is maintained between about 6 and about 8, by using a basic solution (e.g. aqueous NaOH).

The monohydroxybenzophenone can be dissolved in a solvent to form a solution which is then added to the reaction mixture. Again, the solvent in this solution can be the same as the water-immiscible solvent (e.g. methylene chloride), or can be a dilute aqueous basic solution as described above. The solution containing the monohydroxybenzophenone is added to the reaction mixture and allowed to react. Next, a solution containing the tertiary amine catalyst is added to the reaction mixture, which catalyzes the polymerization.

The fourth process uses a tubular reactor. In the tubular reactor, the monohydroxybenzophenone is pre-reacted with the carbonate precursor (specifically phosgene) to form chloroformates. The water-immiscible solvent is used as a solvent in the tubular reactor. In a separate reactor, the dihydroxybenzophenone, diol chain extender, tertiary amine catalyst, water, and water-immiscible solvent are combined to form a reaction mixture. The chloroformates in the tubular reactor are then fed into the reactor over a first time period along with additional carbonate precursor to complete the reaction while the base is co-added to regulate the pH.

To form a cross-linkable polycarbonate using the tubular reactor process, the reaction mixture comprises the dihydroxybenzophenone, diol chain extender, tertiary amine catalyst, water, and water-immiscible solvent. In more specific embodiments, the dihydroxybenzophenone is 4,4'-dihydroxybenzophenone, the diol chain extender is bisphenol-A, the tertiary amine catalyst is triethylamine, and the water-immiscible solvent is methylene chloride. In the tubular reactor, the monohydroxybenzophenone is pre-reacted with phosgene. The pH of the reaction mixture is usually from about 8.5 to about 10 prior to the addition of the chloroformates. During the addition of the chloroformates, the pH is maintained between about 8.5 and about 10, by using a basic solution (e.g. aqueous NaOH).

The resulting photoactive additive (e.g. the cross-linkable polycarbonate) formed using these methods contains only a small amount of low-molecular-weight components. This can be measured in two different ways: the level of diarylcarbonates (DAC) and the lows percentage can be measured. Diarylcarbonates are formed by the reaction of two end-capping agents with phosgene, creating a small molecule that contains no dihydroxybenzophenone or diol chain extender (e.g. bisphenol-A). In embodiments, the resulting photoactive additive contains less than 1000 ppm of diarylcarbonates. The lows percentage is the percentage by weight of oligomeric chains having a molecular weight of less than 1000. In embodiments, the lows percentage is 2.5 wt % or less, including from about 1.0 wt % to 2.5 wt %. The DAC level and the lows percentage can be measured by high performance liquid chromatography (HPLC) or gel permeation chromatography (GPC). Also of note is that the resulting photoactive additive does not contain any residual pyridine, because pyridine is not used in the manufacture of the photoactive additive.

Second Polymer Resin

The photoactive additives described above are blended with a polymeric base resin that is different from the photoactive additive, i.e. a second polymer resin, to form the blends of the present disclosure. More specifically, the second polymer resin does not contain photoactive groups. In embodiments, the weight ratio of the photoactive additive to the polymeric base resin is from 1:99 to 99:1, including from about 50:50 to about 85:15, or from about 10:90 to about 15:85, or from about 25:75 to about 50:50. The polymeric base resin has, in specific embodiments, a weight-average molecular weight of about 21,000 or greater, including from about 21,000 to about 40,000.

The blends may be subjected to cross-linking conditions (e.g., UV-radiation) to affect cross-linking of the photoactive additives in the blend. Accordingly, blend compositions of the present disclosure include blends prior to and after cross-linking.

The blends may comprise one or more distinct cross-linkable polycarbonates, as described herein, and/or one or more cross-linked polycarbonates, as described herein, as the photoactive additive. The blends also comprise one or more additional polymers. The blends may comprise additional components, such as one or more additives. In certain embodiments, a blend comprises a cross-linkable and/or cross-linked polycarbonate (Polymer A) and a second polymer (Polymer B), and optionally one or more additives. In another embodiment, a blend comprises a combination of a cross-linkable and/or cross-linked polycarbonate (Polymer A); and a second polycarbonate (Polymer B), wherein the second polycarbonate is different from the first polycarbonate.

In a preferred embodiment, the blend compositions disclosed herein comprise a flame-retardant, a flame retardant additive, and/or an impact modifier. The flame-retardant may be potassium perfluorobutane sulfonate (Rimar salt), potassium diphenyl sulfone-3-sulfonate (KSS), or a combination thereof.

The second polymer (Polymer B) may be any polymer different from the first polymer that is suitable for use in a blend composition. In certain embodiments, the second polymer may be a a polyester, a polyestercarbonate, a bisphenol-A homopolymer, a polycarbonate copolymer, a tetrabromo-bisphenol A polycarbonate copolymer, a polysiloxane-co-bisphenol-A polycarbonate, a polyesteramide, a polyimide, a polyetherimide, a polyamideimide, a polyether, a polyethersulfone, a polyepoxide, a polylactide, a polylactic acid (PLA), or any combination thereof.

In certain embodiments, the second polymer may be a vinyl polymer, a rubber-modified graft copolymer, an acrylic polymer, polyacrylonitrile, a polystyrene, a polyolefin, a polyester, a polyesteramide, a polysiloxane, a polyurethane, a polyamide, a polyamideimide, a polysulfone, a polyepoxide, a polyether, a polyimide, a polyetherimide, a polyphenylene ether, a polyphenylene sulfide, a polyether ketone, a polyether ether ketone, an acrylonitrile-butadiene-styrene (ABS) resin, an acrylic-styrene-acrylonitrile (ASA) resin, a polyethersulfone, a polyphenylsulfone, a poly(alkenylaromatic) polymer, a polybutadiene, a polyacetal, a polycarbonate, a polyphenylene ether, an ethylene-vinyl acetate copolymer, a polyvinyl acetate, a liquid crystal polymer, an ethylene-tetrafluoroethylene copolymer, an aromatic polyester, a polyvinyl fluoride, a polyvinylidene fluoride, a polyvinylidene chloride, tetrafluoroethylene, a polylactide, a polylactic acid (PLA), a polycarbonate-polyorganosiloxane block copolymer, or a copolymer comprising: (i) an aromatic ester, (ii) an estercarbonate, and (iii) carbonate repeat units. The blend composition may comprise additional polymers (e.g. a third, fourth, fifth, sixth, etc., polymer).

In certain embodiments, the second polymer may be a homopolycarbonate, a copolycarbonate, a polycarbonate-polysiloxane copolymer, a polyester-polycarbonate, or any combination thereof. In certain embodiments, the second polycarbonate is a p-cumyl phenol capped poly(isophthalate-terephthalate-resorcinol ester)-co-(bisphenol-A carbonate) copolymer. In certain embodiments, the second polycarbonate is a polycarbonate-polysiloxane copolymer.

The p-cumyl phenol capped poly(isophthalate-terephthalate-resorcinol ester)-co-(bisphenol-A carbonate) polymer or a polycarbonate-polysiloxane copolymer may have a polysiloxane content from 0.4 wt % to 25 wt %. In one preferred embodiment, the second polymer is a p-cumyl-phenol capped poly (19 mol % isophthalate-terephthalate-resorcinol ester)-co-(75 mol % bisphenol-A carbonate)-co-(6 mol % resorcinol carbonate) copolymer (MW=29,000 Daltons). In another preferred embodiment, the second polymer is a p-cumylphenol capped poly(10 wt % isophthalate-terephthalate-resorcinol ester)-co-(87 wt % bisphenol-A carbonate)-co-(3 mol % resorcinol carbonate) copolymer (MW=29,000 Daltons).

In another preferred embodiment, the second polymer is a polycarbonate polysiloxane copolymer. The polycarbonate-polysiloxane copolymer may be a siloxane block copolycarbonate comprising from about 6 wt % siloxane (±10%) to about 20 wt % siloxane (±10%), and having a siloxane chain length of 10 to 200. In another preferred embodiment, the second polymer is a PC-siloxane copolymer with 20% siloxane segments by weight. In another preferred embodiment, the second polymer is a p-cumyl-phenol capped poly (65 mol % BPA carbonate)-co-(35 mol % 3,3-bis(4-hydroxyphenyl)-2-phenylisoindolin-1-one (PP-PBP) carbonate) copolymer (MW=25,000 Daltons).

In another preferred embodiment, the second polymer is a polyphosphonate polymer, a polyphosphonate copolymer, or a poly(polyphosphonate)-co-(BPA carbonate) copolymer.

In yet other embodiments, the polymer resin in the blend is selected from the group consisting of a polycarbonate-polysiloxane copolymer; a polycarbonate resin having an aliphatic chain containing at least two carbon atoms as a repeating unit in the polymer backbone; a copolyester polymer; a bisphenol-A homopolymer; a polystyrene polymer; a poly(methyl methacrylate) polymer; a thermoplastic polyester; a polybutylene terephthalate polymer; a methyl methacrylate-butadiene-styrene copolymer; an acrylonitrile-butadiene-styrene copolymer; a dimethyl bisphenol cyclohexane-co-bisphenol-A copolymer; a polyetherimide; a polyethersulfone; and a copolycarbonate of bisphenol-A and 1,1-bis(4-hydroxyphenyl)-3,3,5-trimethylcyclohexane) (BPTMC).

In particular embodiments, the polymer resin in the blend is a polycarbonate-polysiloxane (PC-Si) copolymer. The polycarbonate units of the copolymer are derived from dihydroxy compounds having the structures of any of the formulas described above, but particularly those of the chain extenders of Formulas (B) and (C) when Z is hydroxyl. Some illustrative examples of suitable dihydroxy compounds include the following: 1,1-bis(4-hydroxyphenyl) methane, 1,1-bis(4-hydroxyphenyl)ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane; resorcinol, substituted resorcinol compounds such as 5-methyl resorcinol, 5-phenyl resorcinol, or 5-cumyl resorcinol; catechol; hydroquinone; and substituted hydroquinones such as 2-methyl hydroquinone, 2-t-butyl hydroquinone, 2-phenyl hydroquinone, 2-cumyl hydroquinone, or 2,3,5,6-tetramethyl hydroquinone. Bisphenol-A is often part of the PC-Si copolymer.

The polysiloxane blocks of the copolymer can be derived from siloxane-containing dihydroxy monomers. One exemplary siloxane monomer has the structure of Formula (D-1):

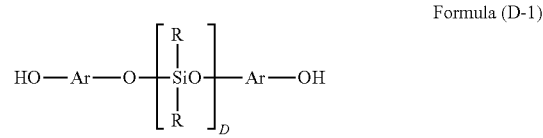

Formula (D-1)

wherein each Ar is independently aryl; each R is independently alkyl, alkoxy, alkenyl, alkenyloxy, aryl, aryloxy, arylalkyl, or alkylaryl; and D is an average value of 2 to about 1000, specifically about 2 to about 500, more specifically about 10 to about 75. Compounds of this formula may be obtained by the reaction of a dihydroxyaromatic compound with, for example, an alpha,omega-bis-acetoxy-poly-diorganosiloxane under phase transfer conditions.

Another exemplary siloxane monomer has the structure of Formula (D-3):

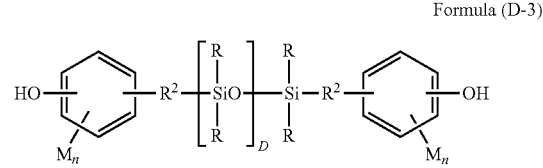

Formula (D-3)

wherein each R is independently alkyl, alkoxy, alkenyl, alkenyloxy, aryl, aryloxy, arylalkyl, or alkylaryl; and D is an average value of 2 to about 1000, specifically about 2 to about 500, more specifically about 10 to about 75; each M is independently cyano, nitro, alkyl, alkoxy, alkenyl, alkenyloxy, aryl, aryloxy, arylalkyl, or alkylaryl; each n is independently an integer from 0 to 4; and each $R_2$ is independently an aliphatic group. Compounds of this formula may be obtained by the reaction of a siloxane hydride with an aliphatically unsaturated monohydric phenol. Suitable aliphatically unsaturated monohydric phenols include, for example, eugenol, 2-alkylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. Mixtures comprising at least one of the foregoing may also be used.

The polymer resin (polymer B) in the blend can be a polycarbonate resin having an aliphatic chain containing at least two carbon atoms as a repeating unit in the polymer backbone. This resin can also be considered a "soft segment

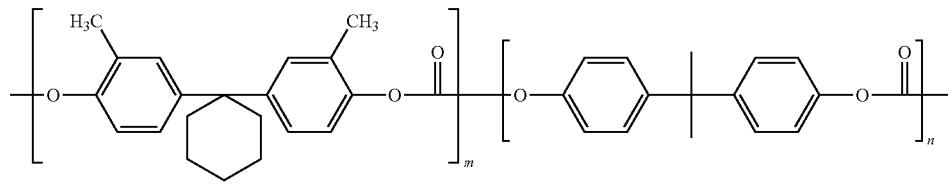

polycarbonate" (SSP) resin. Generally speaking, the SSP resin is a copolymer of an aromatic difunctional compound and an aliphatic difunctional compound. The aromatic difunctional compound may have the structure of, for example, any of Formulas (B)-(J), previously described as chain extenders above. In specific embodiments, the aromatic difunctional compound is a bisphenol of Formula (B). The aliphatic difunctional compound provides a long aliphatic chain in the backbone and may have the structure of Formula (E). Exemplary aliphatic diols that are useful in SSP resins include adipic acid (n=4), sebacic acid (n=8), and dodecanedioic acid (n=10).

The SSP resin can be formed, for example by the phosgenation of bisphenol-A, sebacic acid, and p-cumyl phenol. The SSP resin contains carbonate linkages and ester linkages.

In this regard, it is believed that the crosslinking reaction rate of the photoactive additive and its yield are directly related to the hydrogen-to-ketone ratio of the polymeric blend. Thus, the higher the hydrogen-to-ketone ratio of the blend, the higher the rate of chain-extension reaction/crosslinking should be. Due to the presence of the hydrogen-rich SSP resin with its aliphatic blocks, the hydrogen-to-ketone ratio is relatively high. As a result, the crosslinking density and the resulting flame retardance and chemical resistance should be very good for this blend. In addition, the SSP resin has very good flow properties. It is believed that the blend should also have good flow, and should also retain its ductile properties even after crosslinking.

The polymer resin (polymer B) in the blend can be a copolyester polymer or a polybutylene terephthalate (PBT) polymer. Copolyester resins are commercially available, for example under the TRITAN brand from Eastman Chemical Company. PBT resins are commercially available, for example from SABIC Innovative Plastics under the brand name VALOX.

The polymer resin (polymer B) in the blend can be a bisphenol-A homopolymer. Such resins are available, for example as LEXAN from SABIC Innovative Plastics.

The polymer resin (polymer B) in the blend can be a polystyrene polymer. Such polymers contain only polystyrene monomers. Thus, for example ABS and MBS should not be considered polystyrene polymers.

The polymer resin (polymer B) in the blend can be a thermoplastic polyester. An exemplary polyester is PCTG, which is a copolymer derived from the reaction of terephthalic acid, ethylene glycol, and cyclohexanedimethanol (CHDM). The PCTG copolymer can contain 40-90 mole % CHDM, with the terephthalic acid and the ethylene glycol making up the remaining 10-60 mole %.

The polymer resin (polymer B) in the blend can be a dimethyl bisphenol cyclohexane-co-bisphenol-A copolymer, i.e. a DMBPC-BPA copolymer. This copolymer is illustrated below:

wherein the molar ratio of DMBPC to BPA is m:n. Again, this notation is intended to report the relative molar amounts between the DMBPC units and the BPA units, and should not be construed as denoting the structure of the copolymer (i.e. these two units are randomly distributed and are not blocks). The DMBPC is usually from 20 mole % to 90 mole % of the copolymer, including 25 mole % to 60 mole %. The BPA is usually from 10 mole % to 80 mole % of the copolymer, including 40 mole % to 75 mole %. These resins have high scratch resistance.

Other Additives

Other conventional additives can also be added to the polymeric composition (e.g. an impact modifier, UV stabilizer, colorant, flame retardant, heat stabilizer, plasticizer, lubricant, mold release agent, filler, reinforcing agent, antioxidant agent, antistatic agent, blowing agent, or radiation stabilizer).

In preferred embodiments, the blend compositions disclosed herein comprise a flame-retardant, a flame retardant additive, and/or an impact modifier. The flame-retardant may be potassium perfluorobutane sulfonate (Rimar salt), potassium diphenyl sulfone-3-sulfonate (KSS), or a combination thereof.

Various types of flame retardants can be utilized as additives. In one embodiment, the flame retardant additives include, for example, flame retardant salts such as alkali metal salts of perfluorinated $C_1$-$C_{16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the compositions disclosed herein. In certain embodiments, the flame retardant does not contain bromine or chlorine.

The flame retardant optionally is a non-halogen based metal salt, e.g., of a monomeric or polymeric aromatic sulfonate or mixture thereof. The metal salt is, for example, an alkali metal or alkali earth metal salt or mixed metal salt. The metals of these groups include sodium, lithium, potassium, rubidium, cesium, beryllium, magnesium, calcium, strontium, francium and barium. Examples of flame retardants include cesium benzenesulfonate and cesium p-toluenesulfonate. See e.g., U.S. Pat. No. 3,933,734, EP 2103654, and US2010/0069543A1, the disclosures of which are incorporated herein by reference in their entirety.

Another useful class of flame retardant is the class of cyclic siloxanes having the general formula $[(R)_2SiO]_y$, wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like; phosphates such as trimethyl phosphate, or the like; or combinations comprising at least one of the foregoing heat stabilizers. Heat stabilizers are generally used in amounts of 0.0001 to 1 part by weight, based on 100 parts by weight of the polymer component of the polymeric blend/composition.

Mold release agent (MRA) will allow the material to be removed quickly and effectively. Mold releases can reduce cycle times, defects, and browning of finished product. There is considerable overlap among these types of materials, which may include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 part by weight, specifically 0.01 to 0.75 part by weight, more specifically 0.1 to 0.5 part by weight, based on 100 parts by weight of the polymer component of the polymeric blend/composition.

In particular embodiments, the polymeric blend/composition includes the photoactive additive, an optional polymeric base resin, and a flame retardant which is Rimar salt and which is present in an amount of about 0.05 wt % to about 0.085 wt %, based on the total weight of the composition; and a plaque comprising the polymeric composition has a transparency of 70 to 90% at a thickness of 3.2 mm, measured according to ASTM-D1003-00.

In other particular embodiments, the polymeric blend/composition includes the photoactive additive, an optional polymeric base resin, a flame retardant; a heat stabilizer, and a mold release agent.

The additives, when used, can improve the chemical resistance of the final product. It is contemplated that products can be of any desired shape (e.g. molded article, film, sheet, etc.) and be used in many different applications, for example in the medical, automotive, and consumer electronics fields. Increased chemical resistance may be found against 409 Glass and Surface Cleaner; Alcohol Prep Pad; CaviCide liquid/CaviWipes; CaviWipes; Cidex Plus liquid; Clorox Bleach; Clorox Wipes; Envirocide liquid; For Pro liquid; Gentle dish soap and water; Hydrogen Peroxide Cleaner Disinfectant Wipes; Isopropyl Alcohol wipes; MadaCide-1 liquid; Mar-V-Cide liquid to dilute; Sani-Cloth Bleach Wipes; Sani-Cloth HB Wipes; Sani-Cloth Plus Wipes; Sodium Hypochlorite liquid; Super Sani-Cloth Wipes; Viraguard liquid and Wipes; Virex 256; Windex Blue; Fuel C; Toluene; Heptane; Ethanol; Isopropanol; Windex; Engine oil; WD40; Transmission fluid; Break fluid; Glass wash; Diesel; Gasoline; Banana Boat Sunscreen (SPF 30); Sebum; Ivory Dish Soap; SC Johnson Fantastik Cleaner; French's Yellow Mustard; Coca-Cola; 70% Isopropyl Alcohol; Extra Virgin Olive Oil; Vaseline Intensive Care Hand Lotion; Heinz Ketchup; Kraft Mayonnaise; Chlorox Formula 409 Cleaner; SC Johnson Windex Cleaner with Ammonia; Acetone; Artificial Sweat; Fruits & Passion Cucina Coriander & Olive Hand Cream; Loreal Studioline Megagel Hair Gel; Maybelline Lip Polish; Maybelline Expert Wear Blush—Beach Plum Rouge; Purell Hand Sanitizer; Hot coffee, black; iKlear; Chlorox Wipes; Squalene; Palmitic Acid; Oleic Acid; Palmitoleic Acid; Stearic Acid; and Olive Oil.

Products

Compositions/blends disclosed herein, preferably prior to cross-linking, may be formed, shaped, molded, injection molded, or extruded intoarticle product, particularly thin-walled products, including highly transparent thin-walled products, having improved flame retardance and good physical properties.

The compositions/blends can be molded into useful shaped products by a variety of means such as injection molding, overmolding, co-injection molding, extrusion, multilayer extrusion, rotational molding, blow molding and thermoforming to form products. The formed products may be subsequently subjected to cross-linking conditions (e.g., UV-radiation) to affect cross-linking of the polycarbonates. Exemplary products include a molded article, a film, a sheet, a layer of a multilayer film, or a layer of a multilayer sheet.

Products that may be formed from the compositions/blends include various components for cell phones and cell phone covers, components for computer housings (e.g. mouse covers), fibers, computer housings and business machine housings and parts such as housings and parts for monitors, computer routers, copiers, desk top printers, large office/industrial printers handheld electronic device housings such as computer or business machine housings, housings for hand-held devices, components for light fixtures or home or office appliances, humidifier housings, thermostat control housings air conditioner drain pans, outdoor cabinets, telecom enclosures and infrastructure, Simple Network Intrusion Detection System (SNIDS) devices, network interface devices, smoke detectors, components and devices in plenum spaces, components for medical applications or devices such as medical scanners, X-ray equipment, and ultrasound devices, components for interior or exterior components of an automobile, lenses (auto and non-auto) such as components for film applications, greenhouse components, sun room components, fire helmets, safety shields, safety goggles, glasses with impact resistance, fendors, gas pumps, films for televisions, such as ecofriendly films having no halogen content, solar application materials, glass lamination materials, fibers for glass-filled systems, hand held electronic device enclosures or parts (e.g. walkie-talkie, scanner, media/MP3/MP4 player, radio, GPS system, ebook, tablet), wearable electronic devices (e.g. smart watch, training/tracking device, activity/sleep monitoring system, wristband, or glasses), hand held tool enclosures or parts, smart phone enclosures or parts, turbine blades (e.g., wind turbines), and the like.

In certain embodiments, products that may comprise the composition/blend include automotive bumpers, other automotive, construction and agricultural equipment exterior components, automobile mirror housings, an automobile grille, an automobile pillar, automobile wheel covers, automobile, construction and agricultural equipment instrument panels and trim, construction and agricultural grilles, automobile glove boxes, automobile door hardware and other interior trim, automobile construction and agricultural equipment exterior lights, automobile parts within the engine compartment, plumbing equipment, valves and pumps, air conditioning heating and cooling parts, furnace and heat pump parts, computer parts, electronics parts, projector parts, electronic display parts, copier parts, scanner parts, electronic printer toner cartridges, hair driers, irons, coffee makers, toasters, washing machines, microwaves, ovens, power tools, electric components, lighting parts, dental instruments and equipment, medical instruments, cookware, medical instrument trays, animal cages, fibers, laser welded medical devices, hand held electronic device enclosures or parts (e.g. walkie-talkie, scanner, media/MP3/MP4 player, radio, GPS system, ebook, tablet), wearable electronic devices (e.g. smart watch, training/tracking device, activity/sleep monitoring system, wristband, or glasses), hand held tool enclosures or parts, smart phone enclosures or parts, and fiber optics.

In certain embodiments, products that may comprise the composition/blend include automotive bumpers, other automotive exterior components, automobile mirror housings, an automobile grille, an automobile pillar, automobile wheel covers, automobile instrument panels and trim, automobile glove boxes, automobile door hardware and other interior trim, external automobile trim parts, such as pillars, automobile exterior lights, automobile parts within the engine compartment, an agricultural tractor or device part, a construction equipment vehicle or device part, a construction or agricultural equipment grille, a marine or personal water craft part, an all terrain vehicle or all terrain vehicle part, plumbing equipment, valves and pumps, air conditioning heating and cooling parts, furnace and heat pump parts, computer parts, electronics parts, projector parts, electronic display parts, copier parts, scanner parts, electronic printer toner cartridges, hair driers, irons, coffee makers, toasters, washing machines, microwaves, ovens, power tools, electric components, electric enclosures, lighting parts, dental instruments, medical instruments, medical or dental lighting parts, an aircraft part, a train or rail part, a seating component, sidewalls, ceiling parts, cookware, medical instrument trays, animal cages, fibers, laser welded medical devices, fiber optics, lenses (auto and non-auto), cell phone parts, greenhouse components, sun room components, fire helmets, safety shields, safety glasses, gas pump parts, hand held electronic device enclosures or parts (e.g. walkie-talkie, scanner, media/MP3/MP4 player, radio, GPS system, ebook, tablet), wearable electronic devices (e.g. smart watch, training/tracking device, activity/sleep monitoring system, wristband, or glasses), hand held tool enclosures or parts, smart phone enclosures or parts, and turbine blades.

In certain embodiments, the product is one that requires or must include a material having a UL94 5VA rating performance. Products that require a UL94 5VA rating include, but are not limited to, computer housings, computer housings and business machine housings and parts such as housings and parts for monitors, computer routers, copiers, desk top printers, large office/industrial printers, handheld electronic device housings such as computer or business machine housings, housings for hand-held devices, components for light fixtures including LED fixtures or home or office appliances, humidifier housings, thermostat control housings, air conditioner drain pans, outdoor cabinets, telecom enclosures and infrastructure, Simple Network Intrusion Detection System (SNIDS) devices, network interface devices, smoke detectors, components and devices in plenum spaces, components for medical applications or devices such as medical scanners, X-ray equipment, and ultrasound devices, electrical boxes and enclosures, and electrical connectors.

In certain embodiments, the product is one that requires hydrothermal stability, such as a wind turbine blade, a steam sterilizable medical device, a food service tray, utensils, and equipment.

In certain embodiments, the product is one that requires a combination of transparency, flame resistance, and/or impact resistance. For example, in certain embodiments the product may be a safety shield, safety goggles, a gas/fuel pump housing, a display window or part, or the like.

UV Irradiation

The photoactive additive (PAA) can be blended with one or more polymeric base resins by melt blending or solution blending to form a polymeric composition/blend. The PAA-containing blend can be then be formed into a product by a variety of known processes such as solution casting, profile extrusion, film and/or sheet extrusion, sheet-foam extrusion, injection molding, blow molding, thermoforming, and the like. The product is then exposed to ultraviolet (UV) light at an appropriate wavelength and in an appropriate dosage that brings about the desired amount of crosslinking for the given application. Depending on the end use application and the desired properties, the UV exposure can be performed on one or more surfaces of the product.

The product where the enhanced properties are needed should be exposed with a substantially uniform dose of UV light. The exposure can be accomplished using standard methods known in the art. For example, the UV light can come from any source of UV light such as, but not limited to, those lamps powered by microwave, HID lamps, and mercury vapor lamps. In some other embodiments, the product is exposed by using natural sunlight. The exposure time will be dependent on the application and color of material. It can range from a few minutes to several days. Alternatively, the crosslinking can be accomplished by using a UV-emitting light source such as a mercury vapor, High-Intensity Discharge (HID), or various UV lamps. For example, commercial UV lamps are sold for UV curing from manufacturers such as Hereaus Noblelight Fusion UV. Non-limiting examples of UV-emitting light bulbs include mercury bulbs (H bulbs), or metal halide doped mercury bulbs (D bulbs, H+ bulbs, and V bulbs). Other combinations of metal halides to create a UV light source are also contemplated. Exemplary bulbs could also be produced by assembling the lamp out of UV-absorbing materials and considered as a filtered UV source. An undoped mercury arc lamp is not used for irradiation. An H bulb has strong output in the range of 200 nm to 320 nm. The D bulb has strong output in the 320 nm to 400 nm range. The V bulb has strong output in the 400 nm to 420 nm range.

It may also be advantageous to use a UV light source where the harmful wavelengths (those that cause polymer degradation or excessive yellowing) are removed or not present. Equipment suppliers such as Heraeus Noblelight Fusion UV provide lamps with various spectral distributions. The light can also be filtered to remove harmful or unwanted wavelengths of light. This can be done with optical filters that are used to selectively transmit or reject a wavelength or range of wavelengths. These filters are commercially available from a variety of companies such as Edmund Optics or Praezisions Glas & Optik GmbH. Bandpass filters are designed to transmit a portion of the spectrum, while rejecting all other wavelengths. Longpass edge filters are designed to transmit wavelengths greater than the cut-on wavelength of the filter. Shortpass edge filters are used to transmit wavelengths shorter than the cut-off wavelength of the filter. Various types of materials, such as borosilicate glass, can be used as a long pass filter. Schott and/or Praezisions Glas & Optik GmbH for example have the following long pass filters: WG225, WG280, WG295, WG305, WG320 which have cut-on wavelengths of ~225, 280, 295, 305, and 320 nm, respectively. These filters can be used to screen out the harmful short wavelengths while transmitting the appropriate wavelengths for the crosslinking reaction.

UV wavelengths can be separated into four different categories. UVA refers to wavelengths from 320 nm to 390 nm. UVB refers to wavelengths from 280 nm to 320 nm. UVC refers to wavelengths from 250 nm to 260 nm. UVV refers to wavelengths from 395 nm to 445 nm. In some embodiments, the UV radiation is filtered to provide an effective dosage of at least 2 $J/cm^2$ of UVA radiation and no detectable UVC radiation, as measured using an EIT PowerPuck. In other more specific embodiments, the UV radiation is filtered to provide an effective dosage of at least 3 $J/cm^2$ of UVA radiation and no detectable UVC radiation, or at least 12 $J/cm^2$ of UVA radiation and no detectable UVC radiation, or at least 36 $J/cm^2$ of UVA radiation and no detectable UVC radiation, as measured using an EIT PowerPuck.

In particular embodiments, the product is exposed to a selected UV light range having wavelengths from about 280 nanometers (nm) to about 380 nm, or from about 330 nm to about 380 nm, or from about 280 nm to about 360 nm, or from about 330 nm to about 360 nm. The wavelengths in a "selected" light range have an internal transmittance of greater than 50%, with wavelengths outside of the range having an internal transmittance of less than 50%. The change in transmittance may occur over a range of 20 nm. Reference to a selected light range should not be construed as saying that all wavelengths within the range transmit at 100%, or that all wavelengths outside the range transmit at 0%.

The exposed product will have a cross-linked outer surface and an inner surface that is either lightly cross-linked or not cross-linked. The outer surface can be cross-linked to such a degree that the outer surface is substantially insoluble in the common solvents for the starting resins. The percentage of the insolubles (insoluble component) will be dependent on the part geometry and surface-to-volume ratio.

The following examples are provided to illustrate the polymers, compositions/blends, products, processes and properties of the present disclosure. The examples are merely illustrative and are not intended to limit the disclosure to the materials, conditions, or process parameters set forth therein.

EXAMPLES

All solvents and reagents used were analytical grade.

Molecular weight determinations were performed using gel permeation chromatography (GPC), using a cross-linked styrene-divinylbenzene column and calibrated to polycarbonate references using a UV-VIS detector set at 264 nm. Samples were prepared at a concentration of about 1 mg/ml, and eluted at a flow rate of about 1.0 ml/min. Optionally, a refractive index (RI) detector can be used. The percentage change in the molecular weight was calculated as the change divided by the molecular weight before UV exposure.

Differential scanning calorimetry (DSC) employing a temperature sweep rate of 20° C./min was used to determine glass transition temperatures of polycarbonates.

Flammability testing was conducted using the standard Underwriters Laboratory UL 94 test method (2 day or 7 day conditioning), except that 20 bars rather than the usual 5 bars were tested. Specimens are to be preconditioned either at room temperature for 48 hours or in an air-circulating oven for 168 hours at 70±1° C. and then cooled in a desiccator for at least 4 hours at room temperature, prior to testing. Once removed from the desiccator, specimens are tested within 30 minutes.

Flammability tests were performed following the procedure of Underwriter's Laboratory Bulletin 94 entitled "Tests for Flammability of Plastic Materials, UL94". Several ratings can be applied based on the rate of burning, time to extinguish, ability to resist dripping, and whether or not drips are burning. According to this procedure, materials may be classified as HB, V0, V1, V2, 5V, 5VA and/or 5VB on the basis of the test results obtained for five samples. The criteria for the flammability classifications or "flame retardance" are described below.

V0: A specimen is supported in a vertical position and a flame is applied to the bottom of the specimen. The flame is applied for ten seconds and then removed until flaming stops at which time the flame is reapplied for another ten seconds and then removed. Two sets of five specimens are tested. The two sets are conditioned under different conditions.

To achieve a V0 rating, specimens must not burn with flaming combustion for more than 10 seconds after either test flame application. Total flaming combustion time must not exceed 50 seconds for each set of 5 specimens. Specimens must not burn with flaming or glowing combustion up to the specimen holding clamp. Specimens must not drip flaming particles that ignite the cotton. No specimen can have glowing combustion remain for longer than 30 seconds after removal of the test flame 5VA: Testing is done on both bar and plaque specimens. Procedure for Bars: A bar specimen is supported in a vertical position and a flame is applied to one of the lower corners of the specimen at a 20° angle. The flame is applied for 5 seconds and is removed for 5 seconds. The flame application and removal is repeated five times. Procedure for Plaques: The procedure for plaques is the same as for bars except that the plaque specimen is mounted horizontally and a flame is applied to the center of the lower surface of the plaque.

To achieve a 5VA rating, specimens must not have any flaming or glowing combustion for more than 60 seconds after the five flame applications. Specimens must not drip flaming particles that ignite the cotton. Plaque specimens must not exhibit burnthrough (a hole). It is noted that in the Examples and Tables below, the rows that state whether 5VA was "Pass" or "Fail" for a given thickness refer only to whether the plaque test was passed, and should not be interpreted as stating that no combustion occurred for more than 60 seconds and that there were no drips. Results for both 2-day and 7-day conditioning are reported.

The data was analyzed by calculation of the average flame out time, standard deviation of the flame out time and the total number of drips. Statistical methods were used to convert the data to a probability that a specific formulation would achieve a first time V0 pass or "p(FTP)" in the standard UL 94 testing of 5 bars. The probability of a first time pass on a first submission (pFTP) may be determined according to the formula:

$$pFTP = (P_{t1>mbt, n=0} \times P_{t2>mbt, n=0} \times P_{total<=mbt} \times P_{drip, n=0})$$

where $P_{t1>mbt, n=0}$ is the probability that no first burn time exceeds a maximum burn time value, $P_{t2>mbt, n=0}$ is the probability that no second burn time exceeds a maximum burn time value, $P_{total<=mbt}$ is the probability that the sum of the burn times is less than or equal to a maximum total burn time value, and $P_{drip, n=0}$ is the probability that no specimen exhibits dripping during the flame test. First and second burn time refer to burn times after a first and second application of the flame, respectively.

The probability that no first burn time exceeds a maximum burn time value, $P_{t1>mbt, n=0}$, may be determined from the formula: $P_{t1>mbt, n=0} = (1-P_{t1>mbt})^5$ where $P_{t1>mbt}$ is the area under the log normal distribution curve for t1>mbt, and where the exponent "5" relates to the number of bars tested. The probability that no second burn time exceeds a maximum burn time value may be determined from the formula: $P_{t2>mbt, n=0} = (1-P_{t2>mbt})$ where $P_{t2>mbt}$ is the area under the normal distribution curve for t2>mbt. As above, the mean and standard deviation of the burn time data set are used to calculate the normal distribution curve. For the UL-94 V-0 rating, the maximum burn time is 10 seconds. For a V-1 or V-2 rating the maximum burn time is 30 seconds. The probability $P_{drip, n=0}$ that no specimen exhibits dripping during the flame test is an attribute function, estimated by: $(1-P_{drip})^5$ where $P_{drip}$=(the number of bars that drip/the number of bars tested).

The probability $P_{total<=mbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mbt}$ may be determined from the area under a log normal distribution curve of a set of 1000 Monte Carlo simulated 5-bar total burn time for total<=maximum total burn time. For the UL94 V0 rating, the maximum total burn time is 50 seconds. For a V1 rating, the maximum total burn time is 250 seconds.

Preferably p(FTP) values will be 1 or very close to 1 for high confidence that a sample formulation would achieve a V0 rating in UL 94 testing.

Cross-linked polycarbonate samples were evaluated for chemical resistance under strain conditions. A tensile bar of 3.2 mm thickness was positioned in a strain jig, so that the curvature of the jig induced a 0.5% or 1% stress level on the tensile bar. A portion of the bar was exposed to a solvent by dripping the solvent on top of the tensile bars. The bar was then allowed to sit on the jig for 24 hours, during which time the solvent evaporated. They were then removed from the strain jigs and the % elongation at break was measured following the ASTM D638 Type I method at 50 mm/min.

Samples were sometimes exposed to various doses of filtered UV light. The filtered light was provided by a Loctite Zeta 7411-S system, which used a 400 W metal halide arc lamp and behaved like a D-bulb electrodeless bulb in spectral output with a 280-nm cut-on wavelength filter. The samples were exposed on both sides beneath the UV lights for the equivalent UVA dosage of 12, 36, or 60 J/cm² per side. The UV energy (per pass or dose) for each system is provided below in Table A, and was measured using an EIT PowerPuck. The dose was measured as the energy from 320-390 nm (UVA), 280-320 nm (UVB), 250-260 nm (UVC) and 395-445 nm (UVV). The dose was calculated in $J/cm^2$.

TABLE A

| | Loctite (filtered light). | | | |
|---|---|---|---|---|
| Loctite Dose Filtered | UVA $J/cm^2$ | UVB $J/cm^2$ | UVC $J/cm^2$ | UVV $J/cm^2$ |
| 320 sec exposure | 12.0 | 2.4 | 0 | 7.3 |
| 960 sec exposure | 36.0 | 7.2 | 0 | 21.9 |
| 1600 sec exposure | 60.2 | 12.1 | 0 | 36.6 |

The presence of chloroformate was determined by placing approximately 1 mL of reactor organic phase onto paper tape that is impregnated with 4-(4-nitrobenzyl)pyridine. A yellow-to-orange color change indicated the presence of chloroformate groups.

The presence of unreacted bisphenol-A (BPA) in reactor samples was determined by the following method. 2 mL of reactor sample organic phase was diluted in 5 mL dichloromethane. To the solution was added 5 mL dilute ammonium hydroxide and the mixture shaken vigorously for 30 seconds. To the mixture was added 10 mL of 1% aqueous potassium ferricyanide and the mixture shaken vigorously for 30 seconds. To the mixture was added 5 mL of 1% aqueous 4-aminoantipyrine and the mixture shaken vigorously for 30 seconds. A yellow color indicated an acceptable low amount of residual BPA. An orange to red color indicated an unacceptable high amount of residual BPA.

The Yellowness Index (YI) was measured on 3.2 mm tensile bars before UV exposure and at least 48 hours after UV exposure using an X-Rite Color i7 benchtop spectrophotometer in the transmission mode using CIELAB color equation, an observer angle of 2 degrees, and illuminant C as the light source. YI was measured following ASTM E313-73 (D1925).

The MFR for each sample was calculated using the ASTM D1238 method, 1.2 kg load, 300° C. temperature, 360 second dwell.

The various examples may contain the components shown in Table C.

TABLE C

| Component | Description | Trade name, Source |
|---|---|---|
| Rimar Salt | Potassium perfluorobutanesulfonate | Lanxess |
| Phosphite Stabilizer | Tris (2,4-di-tert-butylphenyl) phosphite | Irgaphos 168 |

Example 1

(A) Preparation of Cross-Linkable Polycarbonates
(i) Solution Addition
Sample A5

Sample A5 was made using solution program addition of 4-hydroxybenzophenone (4-HBP) to obtain a crosslinkable polycarbonate resin containing 5.1 mole % of 4,4'-dihydroxybenzophenone (DHBP) and 3.9 mole % 4-HBP.

A solution of 4-HBP (160 grams, 0.81 moles, 3.9 mole %) was prepared in 2 L of dichloromethane. The 4-HBP solution was placed in an addition pot connected to the reactor via a dosing pump.

To the formulation tank was added dichloromethane (13 L), DI water (10 L), 4,4'-dihydroxybenzophenone (225 grams, 1.1 moles, 5.1 mole %), bisphenol-A (4275 grams, 18.7 moles), triethylamine (52 grams, 0.37 moles) and sodium gluconate (10 grams, iron scavenger). The mixture was stirred for 5 minutes, then transferred to the 70 L batch reactor which was equipped with an overhead condenser, circulation loop, pH probe and various material addition nozzles. The formulation tank was rinsed with dichloromethane (8 L) which was transferred to the batch reactor. The reactor agitator was started and the circulation flow was set at 80 L/min. Phosgene vapor flow to the reactor was initiated (80 g/min flow rate) by a digital control system (DCS) and an initial amount (240 grams, 2.4 moles) was added. The pH of the reaction was maintained at a target of 9.2 by DCS-controlled addition of 33% aqueous NaOH.

After addition of the initial amount of phosgene, the 4-HBP solution was added to the reactor at 500 mL/min flow rate by DCS control while phosgene flow to the reactor continued. Phosgene addition continued until the total set point was reached (2400 grams, 24.3 moles). After completion of the phosgene addition, a sample of the reactor was obtained and verified to be free of un-reacted BPA and free of chloroformate. Mw of a reaction sample was determined by GPC using a UV detector (Mw=22328, PDI=3.4). An additional charge of phosgene was added (200 grams, 2.0 mole) to the reactor. The reactor was purged with nitrogen then the batch was transferred to the centrifuge feed tank.

To the batch in the centrifuge feed tank was added dilution dichloromethane (8 L) then the mixture was purified using a train of liquid-liquid centrifuges. Centrifuge one separated the brine phase. Centrifuge two removed the triethylamine catalyst by extracting the resin solution with aqueous hydrochloric acid (pH 1). Centrifuges three through eight removed residual ions by extracting the resin solution with DI water. A sample of the resin solution was tested and verified less than 5 ppm each of ionic chloride and residual triethylamine.

The resin solution was transferred to the precipitation feed tank. The resin was isolated as a white powder by steam precipitation followed by drying in a cone shaped vessel using heated nitrogen (210 F). Powder yield 3402 grams. Mw=21967 PDI=3.2.

Sample A6

Sample A6 was made using solution program addition of 4-hydroxybenzophenone (4-HBP) to obtain a crosslinkable polycarbonate resin containing 5.1 mole % of 4,4'-dihydroxybenzophenone (DHBP) and 3.3 mole % 4-HBP.

A solution of 4-HBP (135 grams, 0.68 moles, 3.3 mole %) was prepared in 2 L of dichloromethane. The 4-HBP solution was placed in an addition pot connected to the reactor via a dosing pump.

To the formulation tank was added dichloromethane (13 L), DI water (10 L), 4,4'-dihydroxybenzophenone (225 grams, 1.1 moles, 5.1 mole %), bisphenol-A (4275 grams, 18.7 moles), triethylamine (52 grams, 0.37 moles) and sodium gluconate (10 grams, iron scavenger). The mixture was stirred for 5 minutes, then transferred to the 70 L batch reactor which was equipped with an overhead condenser, circulation loop, pH probe and various material addition nozzles. The formulation tank was rinsed with dichloromethane (8 L) which was transferred to the batch reactor. The reactor agitator was started and the circulation flow was set at 80 L/min. Phosgene vapor flow to the reactor was initiated (80 g/min flow rate) by the DCS and an initial amount (240 grams, 2.4 moles) was added. The pH of the reaction was maintained at a target of 9.2 by DCS-controlled addition of 33% aqueous NaOH.

After addition of the initial amount of phosgene, the 4-HBP solution was added to the reactor at 500 mL/min flow rate by DCS control while phosgene flow to the reactor continued. Phosgene addition continued until the total set point was reached (2400 grams, 24.3 moles). After completion of the phosgene addition, a sample of the reactor was obtained and verified to be free of un-reacted BPA and free of chloroformate. Mw of a reaction sample was determined by GPC using a UV detector (Mw=26011, PDI=3.6). An additional charge of phosgene was added (200 grams, 2.0 mole) to the reactor. The reactor was purged with nitrogen then the batch was transferred to the centrifuge feed tank.

To the batch in the centrifuge feed tank was added dilution dichloromethane (8 L) then the mixture was purified using a train of liquid-liquid centrifuges. Centrifuge one separated the brine phase. Centrifuge two removed the triethylamine catalyst by extracting the resin solution with aqueous hydrochloric acid (pH 1). Centrifuges three through eight removed residual ions by extracting the resin solution with DI water. A sample of the resin solution was tested and verified less than 5 ppm each of ionic chloride and residual triethylamine.

The resin solution was transferred to the precipitation feed tank. The resin was isolated as a white powder by steam precipitation followed by drying in a cone shaped vessel using heated nitrogen (210 F). Powder yield 3651 grams. Mw=25682 PDI=3.3.

Sample A7

Sample A7 was made using solution program addition of 4-hydroxybenzophenone (4-HBP) to obtain a crosslinkable polycarbonate resin containing 10.1 mole % of 4,4'-dihydroxybenzophenone (DHBP) and 4.1 mole % 4-HBP.

A solution of 4-HBP (168 grams, 0.85 moles, 4.1 mole %) was prepared in 2 L of dichloromethane. The 4-HBP solution was placed in an addition pot connected to the reactor via a dosing pump.

To the formulation tank was added dichloromethane (13 L), DI water (10 L), 4,4'-dihydroxybenzophenone (450 grams, 2.1 moles, 10.1 mole %), bisphenol-A (4050 grams, 17.7 moles), triethylamine (52 grams, 0.37 moles) and sodium gluconate (10 grams, iron scavenger). The mixture was stirred for 5 minutes, then transferred to the 70 L batch reactor which was equipped with an overhead condenser, circulation loop, pH probe and various material addition nozzles. The formulation tank was rinsed with dichloromethane (8 L) which was transferred to the batch reactor.

The reactor agitator was started and the circulation flow was set at 80 L/min. Phosgene vapor flow to the reactor was initiated (80 g/min flow rate) by the DCS and an initial amount (240 grams, 2.4 moles) was added. The pH of the reaction was maintained at a target of 9.2 by DCS-controlled addition of 33% aqueous NaOH.

After addition of the initial amount of phosgene, the 4-HBP solution was added to the reactor at 500 mL/min flow rate by DCS control while phosgene flow to the reactor continued. Phosgene addition continued until the total set point was reached (2400 grams, 24.3 moles). After completion of the phosgene addition, a sample of the reactor was obtained and verified to be free of un-reacted BPA and free of chloroformate. Mw of a reaction sample was determined by GPC using a UV detector (Mw=22339, PDI=3.0). An additional charge of phosgene was added (200 grams, 2.0 mole) to the reactor. The reactor was purged with nitrogen then the batch was transferred to the centrifuge feed tank.

To the batch in the centrifuge feed tank was added dilution dichloromethane (8 L) then the mixture was purified using a train of liquid-liquid centrifuges. Centrifuge one separated the brine phase. Centrifuge two removed the triethylamine catalyst by extracting the resin solution with aqueous hydrochloric acid (pH 1). Centrifuges three through eight removed residual ions by extracting the resin solution with DI water. A sample of the resin solution was tested and verified less than 5 ppm each of ionic chloride and residual triethylamine.

The resin solution was transferred to the precipitation feed tank. The resin was isolated as a white powder by steam precipitation followed by drying in a cone shaped vessel using heated nitrogen (210 F). Powder yield 3538 grams. Mw=22904 PDI=3.0.

Sample A8

Sample A8 was made using solution program addition of 4-hydroxybenzophenone (4-HBP) to obtain a crosslinkable polycarbonate resin containing 10.2 mole % of 4,4'-dihydroxybenzophenone (DHBP) and 3.4 mole % 4-HBP.

A solution of 4-HBP (140 grams, 0.71 moles, 3.4 mole %) was prepared in 2 L of dichloromethane. The 4-HBP solution was placed in an addition pot connected to the reactor via a dosing pump.

To the formulation tank was added dichloromethane (13 L), DI water (10 L), 4,4'-dihydroxybenzophenone (450 grams, 2.1 moles, 10.2 mole %), bisphenol-A (4050 grams, 17.7 moles), triethylamine (52 grams, 0.37 moles) and sodium gluconate (10 grams, iron scavenger). The mixture was stirred for 5 minutes, then transferred to the 70 L batch reactor which was equipped with an overhead condenser, circulation loop, pH probe and various material addition nozzles. The formulation tank was rinsed with dichloromethane (8 L) which was transferred to the batch reactor. The reactor agitator was started and the circulation flow was set at 80 L/min. Phosgene vapor flow to the reactor was initiated (80 g/min flow rate) by the DCS and an initial amount (240 grams, 2.4 moles) was added. The pH of the reaction was maintained at a target of 9.2 by DCS-controlled addition of 33% aqueous NaOH.

After addition of the initial amount of phosgene, the 4-HBP solution was added to the reactor at 500 mL/min flow rate by DCS control while phosgene flow to the reactor continued. Phosgene addition continued until the total set point was reached (2400 grams, 24.3 moles). After completion of the phosgene addition, a sample of the reactor was obtained and verified to be free of un-reacted BPA and free of chloroformate. Mw of a reaction sample was determined by GPC using a UV detector (Mw=26428, PDI=3.1). An additional charge of phosgene was added (200 grams, 2.0 mole) to the reactor. The reactor was purged with nitrogen then the batch was transferred to the centrifuge feed tank.

To the batch in the centrifuge feed tank was added dilution dichloromethane (8 L) then the mixture was purified using a train of liquid-liquid centrifuges. Centrifuge one separated the brine phase. Centrifuge two removed the triethylamine catalyst by extracting the resin solution with aqueous hydrochloric acid (pH 1). Centrifuges three through eight removed residual ions by extracting the resin solution with DI water. A sample of the resin solution was tested and verified less than 5 ppm each of ionic chloride and residual triethylamine.

The resin solution was transferred to the precipitation feed tank. The resin was isolated as a white powder by steam precipitation followed by drying in a cone shaped vessel using heated nitrogen (210 F). Powder yield 3084 grams. Mw=25955 PDI=3.0.

Sample A9

Sample A9 was made using the processes described above to obtain a crosslinkable polycarbonate resin containing 5.1 mole % of 4,4'-DHBP and 3.8 mole % 4-HBP.

Various properties were then measured using GPC and either a UV detector or an RI detector. The results are shown in Table 1. The "lows" columns indicate the weight percentage of chains with a molecular weight below 1000. The "DAC" indicates the amount of diarylcarbonates.

TABLE 1

| Sample ID | Mol % 4-HBP | Mol % DHBP | Mw UV | PDI UV | Lows % UV | Mw RI | PDI RI | Lows % RI | DAC (ppm) | PDI ratio UV/RI |
|---|---|---|---|---|---|---|---|---|---|---|
| A5 | 3.9 | 5.1 | 22328 | 3.4 | 2.64 | 24736 | 2.4 | 1.2 | — | 1.42 |
| A6 | 3.3 | 5.1 | 26011 | 3.6 | 2.51 | 28226 | 2.8 | 1.5 | — | 1.29 |
| A7 | 4.1 | 10.1 | 22339 | 3.0 | 2.21 | 23578 | 2.4 | 1.2 | — | 1.29 |
| A8 | 3.4 | 10.2 | 26428 | 3.1 | 2.85 | 28133 | 2.5 | 1.1 | — | 1.24 |
| A9 | 3.8 | 5.1 | 21971 | 3.1 | 2.35 | 24979 | 2.4 | 1.1 | 924 | 1.29 |

In Sample A9, the amount of DAC was less than 1000 ppm, and the PDI ratio of UV to RI was less than 1.4.

Blend Examples

Example 2

A crosslinkable polycarbonate (XPC) resin was made with 5 mole % DHBP, remainder bisphenol-A, and 4.0 mole % 4-hydroxybenzophenone endcaps, and having an Mw of about 22,000. This XPC resin was blended with a low-flow bisphenol-A polycarbonate homopolymer having an Mw≈31,000 (LF-PC) in various amounts, and properties were tested.

Plaques and tensile bars were then made from the compositions. The plaques and tensile bars were exposed to 36 J/cm$^2$ of UVA through the Loctite system, with the top facing the UV lamp. After UV exposure, the average gel thickness was measured. The presence of a gel layer indicated that crosslinking had occurred. The YI was also measured before UV exposure, and 48 hours after UV exposure. For flame performance, results for 48 hours are reported on the left column, while results for 168 hours are reported on the right column for each example. Chemical resistance was measured by the elongation at break of tensile bars having 3.2 mm thickness. The results are seen in Table 2.

TABLE 2

|  | G01 | G02 | G03 |
|---|---|---|---|
| 5 mole % DHBP w/HBP endcap (phr) | 100.00 | 50.00 | 25.00 |
| LF-PC (phr) |  | 50.00 | 75.00 |
| Rimar Salt (phr) | 0.08 | 0.08 | 0.08 |
| Phosphite stabilizer (phr) | 0.06 | 0.06 | 0.06 |
| MW by UV detector | | | |
| No UV exposure | 21501 | 23247 | 24585 |
| Following UV exposure | 25388 | 29057 | 33313 |
| Increase | 3887 | 5810 | 8728 |
| MW - RI | | | |
| No UV exposure | 22753 | 24416 | 25906 |
| MFR (1.2 kg/300° C., 360 sec) | 12.1 | 8.88 | 7.36 |
| MFR (1.2 kg/300° C., 1080 sec) | 12.1 | 9.05 | 7.86 |
| Gel Thickness (micron) | 35.97 | 26.55 | 12.58 |
| YI unexposed part | 3.44 | 2.35 | 2.01 |
| YI after 6 passes | 13.42 | 12.23 | 10.61 |
| Delta YI | 10.0 | 9.9 | 8.6 |
| Flame Performance (non-UV exposure) | | | |
| Flaming drips out of 3 @ 1.0 mm (48 hr) | 2 | 2 | 2 |
| Flaming drips out of 2 @ 1.2 mm (48 hr) | 2 | 1 | 2 |
| 5VB @ 1.2 mm (48 hr/168 hr) | Fail  Fail | Fail  Fail | Fail  Fail |
| 5VA @ 1.5 mm (48 hr/168 hr) | Fail  Fail | Fail  Fail | Fail  Fail |
| Flame Performance (UV exposure) | | | |
| p(FTP) for V0 @ 1.0 mm (48 hr) | 0.128 | 0.0535 | 0.1251 |
| flaming drips | 3 | 0 | 0 |
| p(FTP) for V0 @ 1.2 mm (48 hr) | 0.6685 | 0.1634 | 0.5607 |
| flaming drips | 0 | 2 | 1 |
| p(FTP) for V0 @ 1.5 mm (48 hr) | — | 0.1891 | 0.7065 |
| flaming drips | — | 2 | 0 |
| 5VB @ 1.2 mm (48 hr/168 hr) | Pass  Pass | Fail  Pass | Fail  Pass |
| 5VA @ 1.5 mm (48 hr/168 hr) | Pass  Pass | Pass  Pass | Pass  Pass |
| Chemical Resistance (Elongation @ Break) | | | |
| As molded bar | 129.6 | 125.5 | 125.5 |
| Acetone @ 0.5% strain | | | |
| No UV | 2.3 | 6.3 | 8.1 |
| Exposed to UV | 96.4 | 98.1 | 103.5 |
| Acetone @ 1% strain | | | |
| No UV | Fail | 5.2 | Fail |
| Exposed to UV | 63.3 | 76.5 | 92.9 |

Generally, the gel thickness decreased as the amount of XPC resin decreased. The blends generally had a greater increase in molecular weight after UV exposure as the amount of XPC resin decreased, and also had a lower MFR. The blends also had better chemical resistance than the neat resins.

Example 3

Two additional XPC resins were formulated. One XPC resin was made with 10 mole % DHBP, remainder bisphenol-A, and 4.0 mole % 4-hydroxybenzophenone endcaps, and had an Mw of about 22,000. The other XPC resin was made with 10 mole % DHBP, remainder bisphenol-A, and 4.0 mole % 4-hydroxybenzophenone endcaps, and had an Mw of about 26,000. These XPC resin were blended with a low-flow bisphenol-A polycarbonate homopolymer having an Mw 31,000 (LF-PC) in various amounts. Samples were exposed to 36 J/cm$^2$ of UVA through the Loctite system, with the top facing the UV lamp. The properties were then tested and reported in Table 3. Flame performance after 2-day conditioning is reported.

TABLE 3

|  | H01 | H02 | H03 | H04 |
| --- | --- | --- | --- | --- |
| 10 mole % DHBP w/HBP endcap (Mw ~22k) (phr) | 100.00 | 12.50 | | |
| 10 mole % DHBP w/HBP endcap (Mw ~26k) (phr) | | | 100.00 | 12.50 |
| LF-PC (phr) | | 87.50 | | 87.50 |
| Rimar Salt (phr) | 0.08 | 0.08 | 0.08 | 0.08 |
| Phosphite stabilizer (phr) | 0.06 | 0.06 | 0.06 | 0.06 |
| MW by UV detector | | | | |
| No UV exposure | | | | |
| Mw | 22096 | 28142 | 25185 | 28801 |
| Mn | 5930 | 6582 | 7604 | 4694 |
| PDI | 3.73 | 4.28 | 3.31 | 6.14 |
| Following UV exposure | | | | |
| Mw | 25600 | 38775 | 29389 | 40342 |
| Mn | 6541 | 5664 | 7612 | 5743 |
| PDI | 3.91 | 6.85 | 3.86 | 7.02 |
| Increase in MW | 3504 | 10633 | 4204 | 11541 |
| MFR (1.2 kg/300° C., 360 sec) | 16.6 | 7.65 | 9.87 | 7.11 |
| MFR (1.2 kg/300° C., 1080 sec) | 16.67 | 7.74 | 9.96 | 7.32 |
| Gel Thickness (micron) | 55.53 | 0.70 | 66.50 | 4.02 |
| YI unexposed part | 6.06 | 2.55 | 7.25 | 2.78 |
| YI after UV exposure | 25.49 | 14.51 | 25.06 | 16.67 |
| Delta YI | 19.4 | 12.0 | 17.8 | 13.9 |
| Flame Performance (non-UV exposure) | | | | |
| p(FTP) for V0 @ 1.2 mm (48 hr) | 0 | 0 | 0 | 0.022 |
| Flaming drips | 5 | 4 | 4 | 2 |
| Flame Performance (UV exposure) | | | | |
| p(FTP) for V0 @ 1.0 mm (48 hr) | 0.3526 | 0.5499 | 0.1753 | 0.7336 |
| flaming drips | 0 | 0 | 0 | 0 |
| p(FTP) for V0 @ 1.2 mm (48 hr) | 0.2287 | 0.8161 | 0.3425 | 0.7373 |
| flaming drips | 2 | 0 | 0 | 0 |
| Chemical Resistance (Elongation @ Break) | | | | |
| As molded bar | 108.5 | 123.2 | 128.3 | 121.1 |
| Acetone @ 0.5% strain | | | | |
| No UV | Fail | 12.3 | Fail | 4.4 |
| Exposed to UV | 52.4 | 101.6 | 83.7 | 99.4 |
| Acetone @ 1% strain | | | | |
| No UV | Fail | Fail | Fail | Fail |
| Exposed to UV | 52.3 | 34.2 | 70.7 | 85.9 |

Comparing the results of Table 2 (5 mole % DHBP) to Table 3 (10 mole % DHBP), the resins of Table 2 showed less total yellowing after UV exposure, and also had a lower delta YI of 12 or less after 48 hours. The resins of Table 3 generally had more gel and had a greater increase in molecular weight. However, when blended to the same DHBP content (i.e. compare G03 to H02 and H04), the gel thickness was much higher using 5 mole % DHBP (3× higher). When using the unblended resins (compare G01 to H01 and H03), the flame performance is also better when using 5 mole % DHBP, particularly at 1.22 mm thickness. In addition, the resins using 5 mole % DHBP had better chemical resistance to acetone, particularly at 0.1% strain.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A photoactive additive formed from the reaction of:
   a monohydroxybenzophenone;
   a dihydroxybenzophenone;
   a diol chain extender;
   a first linker moiety comprising a plurality of functional groups, wherein each functional group reacts with the hydroxyl groups of the monohydroxybenzophenone, the dihydroxybenzophenone and the diol chain extender; and
   a non-photoactive end-capping agent selected from the group consisting of p-cumylphenol and octylphenol;
   wherein the photoactive additive does not contain any residual pyridine; and
   wherein the additive is made by the process of:
      combining the dihydroxybenzophenone, the diol chain extender, an aliphatic tertiary amine catalyst, water, and a water-immiscible solvent to form a reaction mixture;
      adding the first linker moiety to the reaction mixture over a first time period while co-adding a base to regulate the reaction pH;
      adding the monohydroxybenzophenone to the reaction mixture for a second time period while continuing to add the first linker moiety and the base; and
      continuing to add the first linker moiety and the base to the reaction mixture for a third time period after addition of the monohydroxybenzophenone is complete to obtain the photoactive additive.

2. The additive of claim 1, wherein the additive contains at least 2.8 mole % endcap groups derived from the monohydroxybenzophenone and has a weight average molecular weight of at most 32,000.

3. The additive of claim 1, wherein the additive contains at least 3.0 mole % endcap groups derived from the monohydroxybenzophenone and has a weight average molecular weight of at most 30,000.

4. The additive of claim 1, wherein the additive contains less than 10 mole % of the dihydroxybenzophenone and a tensile bar of the additive of 3.2 mm thickness has at least 70% elongation at break when exposed to acetone at 1% strain after being exposed to 36.0 J/cm² of UVA radiation.

5. The additive of claim 4, containing about 5 mole % of the dihydroxybenzophenone.

6. The additive of claim 1, wherein the additive contains less than 10 mole % of the dihydroxybenzophenone and a tensile bar of the additive of 3.2 mm thickness has a delta YI of 12 or less after being exposed to at least 36.0 J/cm² of UVA radiation, the YI being measured before UV exposure and at least 48 hours after UV exposure.

7. The additive of claim 6, containing about 5 mole % of the dihydroxybenzophenone.

8. The additive of claim 1, wherein the photoactive additive comprises about 0.5 mole % to 5.0 mole % endcap groups derived from the monohydroxybenzophenone.

9. The additive of claim 1, wherein the monohydroxybenzophenone is 4-hydroxybenzophenone.

10. The additive of claim 1, wherein the photoactive additive comprises about 0.5 mole % to about 50 mole % of the dihydroxybenzophenone.

11. The additive of claim 1, wherein the dihydroxybenzophenone is 4,4'-dihydroxybenzophenone.

12. The additive of claim 1, having a weight average molecular weight of 15,000 or greater.

13. The additive of claim 1, wherein the molar ratio of the monohydroxybenzophenone to the first linker moiety is from 1:2 to 1:200.

14. The additive of claim 1, wherein the molar ratio of the dihydroxybenzophenone to the first linker moiety is from 1:2 to 1:200.

15. The additive of claim 1, wherein the photoactive additive is a cross-linkable polycarbonate resin having a weight-average molecular weight from 17,000 to 80,000 Daltons, as measured by gel permeation chromatography using a UV-VIS detector and polycarbonate standards.

16. The additive of claim 1, wherein the photoactive additive is a cross-linkable polycarbonate resin having a polydispersity index (PDI) of between 2.0 and 3.5 as measured by gel permeation chromatography using a UV-VIS detector and polycarbonate standards.

17. The additive of claim 1, wherein the monohydroxybenzophenone is 4-hydroxybenzophenone; the dihydroxybenzophenone is 4,4'-dihydroxybenzophenone; the diol chain extender is bisphenol-A; and the first linker moiety is phosgene.

18. The additive of claim 1, wherein the diol chain extender has the structure of one of the following Formulas (B)-(I):

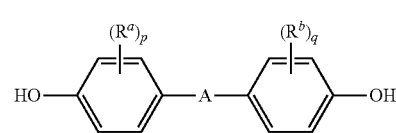

(B)

wherein $R^a$ and $R^b$ each represent a halogen atom or a monovalent hydrocarbon group and may be the same or different; p and q are each independently integers of 0 to 4;

and A represents one of the groups of formula (B-1):

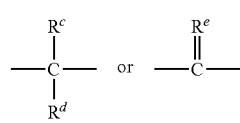

(B-1)

wherein $R^c$ and $R^d$ each independently represent a hydrogen atom or a monovalent linear or cyclic hydrocarbon group and $R^e$ is a divalent hydrocarbon group;

 (C)

wherein each $R^k$ is independently a $C_{1-10}$ hydrocarbon group, and n is 0 to 4;

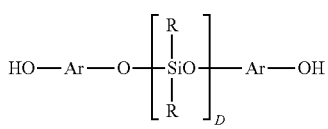 (D-1)

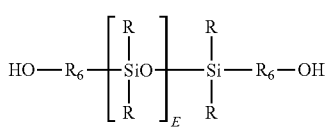 (D-2)

wherein each Ar is independently aryl; each R is independently alkyl, alkoxy, alkenyl, alkenyloxy, aryl, aryloxy, arylalkyl, or alkylaryl; each $R_6$ is independently a divalent $C_1$-$C_{30}$ organic group such as a $C_1$-$C_{30}$ alkyl, $C_1$-$C_{30}$ aryl, or $C_1$-$C_{30}$ alkylaryl; and D and E are an average value of 2 to about 1000;

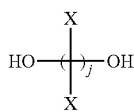 (E)

wherein each X is independently hydrogen, halogen, or alkyl; and j is an integer from 1 to 20;

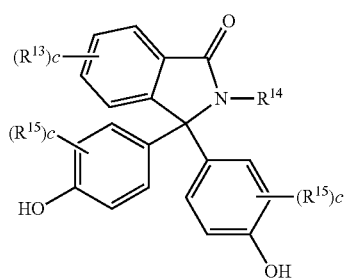 (F)

wherein $R^{13}$ and $R^{15}$ are each independently a halogen or a $C_1$-$C_6$ alkyl group, $R^{14}$ is a $C_1$-$C_6$ alkyl, phenyl, or phenyl substituted with up to five halogens or $C_1$-$C_6$ alkyl groups, and c is 0 to 4;

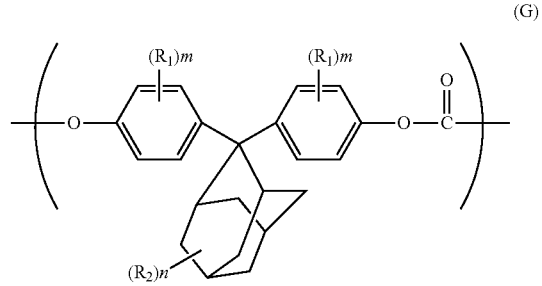 (G)

wherein $R_1$ represents a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms, or a fluoroalkyl group having 1 to 6 carbon atoms; $R_2$ represents a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms, or a fluoroalkyl group having 1 to 12 carbon atoms; m represents an integer of 0 to 4; and n represents an integer of 0 to 14;

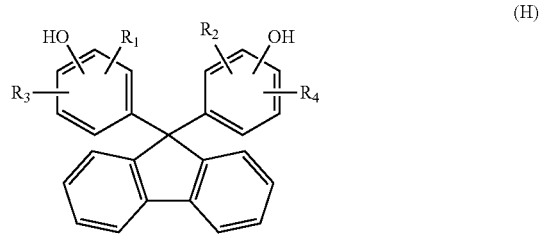 (H)

wherein $R_1$ to $R_4$ are each independently a hydrogen atom, a hydrocarbon group with 1 to 9 carbon atoms which may contain an aromatic group, or a halogen atom; or

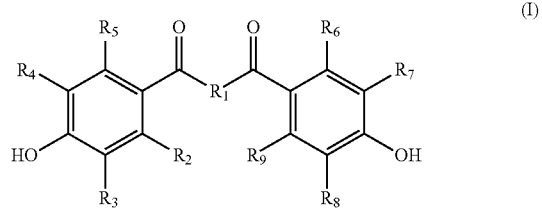 (I)

wherein $R_1$ is an isosorbide unit and $R_2$-$R_9$ are each independently a hydrogen, a halogen, a $C_1$-$C_6$ alkyl, a methoxy, an ethoxy, or an alkyl ester.

19. The additive of claim 1, wherein the first linker moiety has the structure of one of the following Formulas (30), (32), or (33):

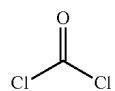

Formula (30)

-continued

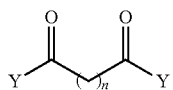

Formula (32)

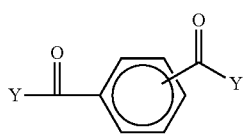

Formula (33)

where Y is hydroxyl, halogen, alkoxy, or aryloxy; and where n is 1 to 20.

20. The additive of claim 1, wherein the reaction that forms the photoactive additive further comprises a secondary linker moiety having at least three functional groups, each of which can react with a functional group of the first linker moiety.

21. A product formed from a composition comprising the photoactive additive of claim 1.

22. The product of claim 21, wherein the product is at least one of an automotive bumper, an automotive exterior component, an automotive mirror housing, an automobile grille, an automobile pillar, an automobile wheel cover, an automobile instrument panel or trim, an automobile glove box, an automobile door hardware or other interior trim, an automobile exterior light, an automobile part within the engine compartment, an agricultural tractor or device part, a construction equipment vehicle or device part, a construction or agricultural equipment grille, a marine or personal water craft part, an all terrain vehicle or all terrain vehicle part, plumbing equipment, a valve or pump, an air conditioning heating or cooling part, a furnace or heat pump part, a computer part, a computer router, a desk top printer, a large office/industrial printer, an electronics part, a projector part, an electronic display part, a copier part, a scanner part, an electronic printer toner cartridge, a hair drier, an iron, a coffee maker, a toaster, a washing machine or washing machine part, a microwave, an oven, a power tool, an electric component, an electric enclosure, a lighting part, a dental instrument, a medical instrument, a medical or dental lighting part, an aircraft part, a train or rail part, a seating component, a sidewall, a ceiling part, cookware, a medical instrument tray, an animal cage, fibers, a laser welded medical device, fiber optics, a lense (auto and non-auto), a cell phone part, a greenhouse component, a sun room component, a fire helmet, a safety shield, safety glasses, a gas pump part, a humidifier housing, a thermostat control housing, an air conditioner drain pan, an outdoor cabinet, a telecom enclosure or infrastructure, a Simple Network Detection System (SNIDS) device, a network interface device, a smoke detector, a component or device in a plenum space, a medical scanner, X-ray equipment, a construction or agricultural equipment, a hand held electronic device enclosure or part, a walkie-talkie enclosure or part, a scanner enclosure or part, a media/MP3/MP4 player enclosure or part, a radio enclosure or part, a GPS system enclosure or part, an ebook enclosure or part, a tablet enclosure or part, a wearable electronic device, a smart watch, a wearable training/tracking device, a wearable activity/sleep monitoring system, a wearable electronic wristband, electronic glasses, a hand held tool enclosure or part, a smart phone enclosure or part, and a turbine blade.

23. The product of claim 21, wherein the product is a film, a sheet, a layer of a multilayer film, or a layer of a multilayer sheet.

24. The product of claim 21, wherein the product is formed by injection molding, overmolding, co-injection molding, extrusion, multilayer extrusion, rotational molding, blow molding, or thermoforming.

25. The product of claim 21, wherein the product is exposed to UV radiation to cause crosslinking of the photoactive additive.

26. The product of claim 21, wherein the product is transparent, or has a thin wall having a cross-section of 3 mm or less.

27. A process for improving at least one property of a product produced from a polymeric base resin, comprising:
   blending with the polymeric base resin the photoactive additive of claim 1 to produce a blend;
   forming the product from the blend; and
   exposing a surface of the formed product to an effective dosage of ultraviolet radiation to cause crosslinking on the surface of the product.

28. The process of claim 27, wherein the improved property is selected from the group consisting of anti-drip, flame retardance, chemical resistance, tear resistance, impact strength, ductility, hydrolytic stability, and weatherability.

29. The process of claim 27, wherein the UV radiation is filtered using a 280 nm long pass filter to provide no detectable UVC radiation.

30. The process of claim 27, wherein the UV radiation source is a metal halide doped mercury lamp, an electrodeless D-bulb, an electrodeless H-bulb, an electrodeless V-bulb, a Xenon Arc lamp, or a UVA (320-390 nm) light emitting diode (LED).

31. A crosslinked layer formed from a polymeric blend that has been exposed to UV radiation, the blend comprising:
   a photoactive additive that is a cross-linkable polycarbonate resin formed from the reaction of a monohydroxybenzophenone, a dihydroxybenzophenone, a diol chain extender, a non-photoactive end-capping agent, and a first linker moiety comprising a plurality of functional groups, wherein each functional group reacts with the hydroxyl groups of the monohydroxybenzophenone, the dihydroxybenzophenone and the diol chain extender; and
   a polymer resin which is different from the photoactive additive;
   wherein the non-photoactive end-capping agent is selected from the group consisting of p-cumylphenol and octylphenol; and
   wherein the photoactive additive does not contain any residual pyridine.

32. The layer of claim 31, wherein the crosslinked layer contains chains from both the photoactive additive and the polymer resin.

33. The layer of claim 31, wherein the crosslinking is sufficient to create a continuous insoluble layer containing both the photoactive additive and the polymer resin.

34. The layer of claim 31, wherein the crosslinked layer is formed by exposure to 36.0 J/cm$^2$ of UVA radiation and no detectable UVC radiation.

35. A composition comprising a cross-linked polycarbonate, the cross-linked polycarbonate derived from a cross-linkable polycarbonate resin formed from the reaction of a monohydroxybenzophenone, a dihydroxybenzophenone, a diol chain extender, and a first linker moiety comprising a plurality of functional groups, wherein each functional group reacts with the hydroxyl groups of the monohydroxybenzophenone, the dihydroxybenzophenone and the diol chain extender; wherein the reaction does not include pyridine; wherein the cross-linkable polycarbonate resin further contains endcaps derived from an end-capping agent selected from the group consisting of p-cumylphenol and octylphenol.

36. The composition of claim 35, wherein the monohydroxybenzophenone is 4-hydroxybenzophenone; the dihydroxybenzophenone is 4,4'-dihydroxybenzophenone; the diol chain extender is bisphenol-A; and the first linker moiety is phosgene.

37. The composition of claim 35, wherein the cross-linkable polycarbonate resin contains from about 0.5 mole % to about 5.0 mole % of endcaps derived from the monohydroxybenzophenone prior to cross-linking.

38. The composition of claim 35, wherein the cross-linkable polycarbonate resin contains from about 0.5 mole % to about 50 mole % of the dihydroxybenzophenone prior to cross-linking.

39. The composition of claim 35, wherein the cross-linkable polycarbonate resin has a weight average molecular weight of 15,000 or greater prior to cross-linking.

40. The composition of claim 35, wherein the cross-linkable polycarbonate resin has a weight-average molecular weight from 17,000 to 80,000 Daltons, as measured by gel permeation chromatography using a UV-VIS detector and polycarbonate standards prior to cross-linking.

41. The composition of claim 35, wherein the cross-linkable polycarbonate resin has a polydispersity index (PDI) of between 2.0 and 3.5 as measured by gel permeation chromatography using a UV-VIS detector and polycarbonate standards prior to cross-linking.

42. The composition of claim 35, wherein the cross-linkable polycarbonate resin has a melt flow rate of about 1 to about 40 g/10 min at 300° C./1.2 kg/360 sec dwell prior to cross-linking.

43. The composition of claim 35, wherein a plaque formed from the composition can achieve UL94 5VA performance at a thickness of 1.5 mm (±10%) after UV irradiation of 36.0 J/cm² UVA.

44. The composition of claim 35, wherein when a plaque of the composition is exposed to 36.0 J/cm² of UVA radiation, the cross-linkable polycarbonate resin increases in molecular weight by at least 15%.

45. The composition of claim 35, wherein a tensile bar of the composition of 3.2 mm thickness has at least 90% elongation at break when exposed to acetone at 0.5% strain after being exposed to 36.0 J/cm² of UVA radiation.

46. The composition of claim 35, further comprising an impact modifier, UV stabilizer, colorant, flame retardant, heat stabilizer, plasticizer, lubricant, mold release agent, filler, reinforcing agent, antioxidant agent, antistatic agent, blowing agent, or radiation stabilizer.

47. The composition of claim 46, wherein the flame retardant is potassium perfluorobutane sulfonate (Rimar salt), potassium diphenyl sulfone-3-sulfonate (KSS), or a combination thereof.

48. A blend comprising:
a photoactive additive that is a cross-linkable polycarbonate resin formed from the reaction of a monohydroxybenzophenone, a dihydroxybenzophenone, a diol chain extender, a non-photoactive end-capping agent, and a first linker moiety comprising a plurality of functional groups, wherein each functional group reacts with the hydroxyl groups of the monohydroxybenzophenone, the dihydroxybenzophenone and the diol chain extender; and
a polycarbonate resin that is not the photoactive additive;
wherein the non-photoactive end-capping agent is selected from the group consisting of p-cumylphenol and octylphenol; and
wherein the photoactive additive does not contain any residual pyridine.

49. The blend of claim 48, further comprising a flame retardant that is potassium perfluorobutane sulfonate (Rimar salt), potassium diphenyl sulfone-3-sulfonate (KSS), or a combination thereof.

50. The blend of claim 48, wherein a plaque formed from the blend can achieve UL94 5VA performance at a thickness of 1.5 mm (±10%) after UV irradiation of 36.0 J/cm² UVA.

51. The blend of claim 48, wherein the cross-linkable polycarbonate resin contains about 5 mole % of the dihydroxybenzophenone.

52. The additive of claim 1, wherein the additive comprises from 95 wt % to about 99 wt % of the diol chain extender.

53. The additive of claim 17, wherein the additive comprises from 95 wt % to about 99 wt % of bisphenol-A.

* * * * *